(12) United States Patent
Kojima

(10) Patent No.: US 7,831,583 B2
(45) Date of Patent: Nov. 9, 2010

(54) DOCUMENT RETRIEVAL SYSTEM, DOCUMENT RETRIEVAL APPARATUS, DOCUMENT RETRIEVAL METHOD, PROGRAM, AND STORAGE MEDIUM

(75) Inventor: Nobuyuki Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 11/750,530

(22) Filed: May 18, 2007

(65) Prior Publication Data

US 2007/0299827 A1 Dec. 27, 2007

(30) Foreign Application Priority Data

Jun. 23, 2006 (JP) ............................. 2006-173622

(51) Int. Cl.
*G06F 7/00* (2006.01)
(52) U.S. Cl. ...................................... 707/706; 707/722
(58) Field of Classification Search ............... 707/1–10, 707/706, 722, 999.001–999.009, 999.01
See application file for complete search history.

(56) References Cited

U.S. PATENT DOCUMENTS

2003/0140097 A1* 7/2003 Schloer ...................... 709/203

FOREIGN PATENT DOCUMENTS

| JP | 8314965 A | 11/1996 |
|---|---|---|
| JP | 2005-327023 A | 11/2005 |

* cited by examiner

*Primary Examiner*—Mohammad Ali
*Assistant Examiner*—John P Hocker
(74) *Attorney, Agent, or Firm*—Canon USA Inc IP Division

(57) ABSTRACT

In a document retrieval system for retrieving a document from documents stored in storage devices according to a retrieval condition input by a user, the storage device where a retrieval is carried out is selected from the storage devices, and the retrieval condition is input. In the selected storage device, when the retrieval according to the input retrieval condition is carried out, based on a retrieval result, information indicating the number of documents satisfying the retrieval condition is managed for each storage device where the retrieval is carried out. When the retrieval condition is input, based on the managed information, whether the number of documents stored in any selected storage device and satisfying the input retrieval condition is larger than a predetermined number is determined before carrying out the retrieval. As a result of this determination, control of whether to conduct the retrieval is achieved.

9 Claims, 17 Drawing Sheets

DOCUMENT RETRIEVAL SYSTEM, DOCUMENT RETRIEVAL APPARATUS, DOCUMENT RETRIEVAL METHOD, PROGRAM, AND STORAGE MEDIUM

BACKGROUND OF THE INVENTION

1. Field of the Invention

The present invention relates to a document retrieval system for retrieving a document from a plurality of documents stored in storage devices in accordance with a retrieval condition input by a user and a document retrieval apparatus, and a control method, a program, and a storage medium therefor.

2. Description of the Related Art

Up to now, when a document desired by a user is searched for from a plurality of documents stored in a large capacity storage device such as a document management server, the user inputs a retrieval condition for retrieving the document and the retrieval can be carried out in accordance with the input retrieval condition. At this time, for the retrieval condition, for example, a part of character string included in the document of the retrieval target can be specified as a retrieval key word or a retrieval logical expression for representing a combination of the key words can be specified.

In recent years, the allowable storage capacity of a storage medium such as the document management server has increased and it is possible to store a large number of documents therein. Also, for example, when a plurality of multi function peripherals (MFPs) provided with a storage device such as a hard disk drive (HDD) are connected on a network, it is possible to retrieve a desired document from a plurality of documents stored on the HDDs of the MFPs. Under these environments, the number of documents to be set as the retrieval target can be significantly large.

Depending on a retrieval condition input by the user, the number of documents included in the retrieval results can be greater than a user expects, and such a problem may occur that the desired document cannot be found. In particular, when a user who is not familiar with the retrieval carries out a retrieval, the user repeatedly inputs retrieval conditions in order to obtain the expected retrieval result and the retrieval needs to be carried out each time, which is time consuming.

In order to solve the above-described problem, a technique is known for reducing the amount of time it takes when a retrieval is carried out in accordance with a retrieval condition input by a user. To be more specific, while the user inputs the retrieval condition and carries out the retrieval, the retrieval is interrupted when the retrieval results exceed a predetermined threshold (refer to Japanese Patent Laid-Open No. 08-314965).

However, the above-described conventional technique has the following problem. That is, according to Japanese Patent Laid-Open No. 08-314965, in a case where the retrieval results are too large, the retrieval is interrupted before the completion of the retrieval and the re-input of a retrieval condition can be performed. However, until the retrieval is started, it is impossible to find out how many documents are included in the retrieval results.

For that reason, irrespective of a possibility that the retrieval is interrupted, the user needs to wait for the progress of the retrieval process. Also, a retrieval engine for actually executing the retrieval process ends up performing a meaningless retrieval process when the retrieval results are extremely large and the user then creates a retrieval condition again. Furthermore, in such an environment that a storage device which stores retrieval target documents or a retrieval engine is located at the outside while being connected via a network, information about a retrieval request, a retrieval result, etc. needs to be repeatedly sent on the network. This can result in placing a significant load on the network.

SUMMARY OF THE INVENTION

The present invention has been made in view of the above-described problem and accordingly provides a document retrieval system, method, and program in which it is possible to determine whether an input retrieval condition is appropriate based on the previously managed information before the retrieval is carried out.

According to an aspect of the present invention, a document retrieval system, which performs a retrieval of at least one document from documents stored in a plurality of storage devices in accordance with a retrieval condition input by a user, includes a selection unit configured to select at least one storage device, in which the retrieval is carried out, from the plurality of storage devices, an input unit configured to input the retrieval condition, a management unit configured to manage information indicating a number of documents which satisfy the retrieval condition based on a result of the retrieval, the information being managed for each storage device, a determination unit configured to determine whether a number of documents which are stored in any of the selected storage device and satisfy the input retrieval condition is larger than a predetermined number based on the information managed by the management unit before the retrieval is carried out, and a control unit configured to control whether to carry out the retrieval in accordance with a result of a determination by the determination unit.

Further features and aspects of the present invention will become apparent from the following description of exemplary embodiments with reference to the attached drawings.

BRIEF DESCRIPTION OF THE DRAWINGS

The accompanying drawings, which are incorporates in and constitute a part of the specification, illustrate embodiments of the invention and, together with the description, serve to explain the principle of the invention.

DESCRIPTION OF THE EMBODIMENTS

Figure 1:
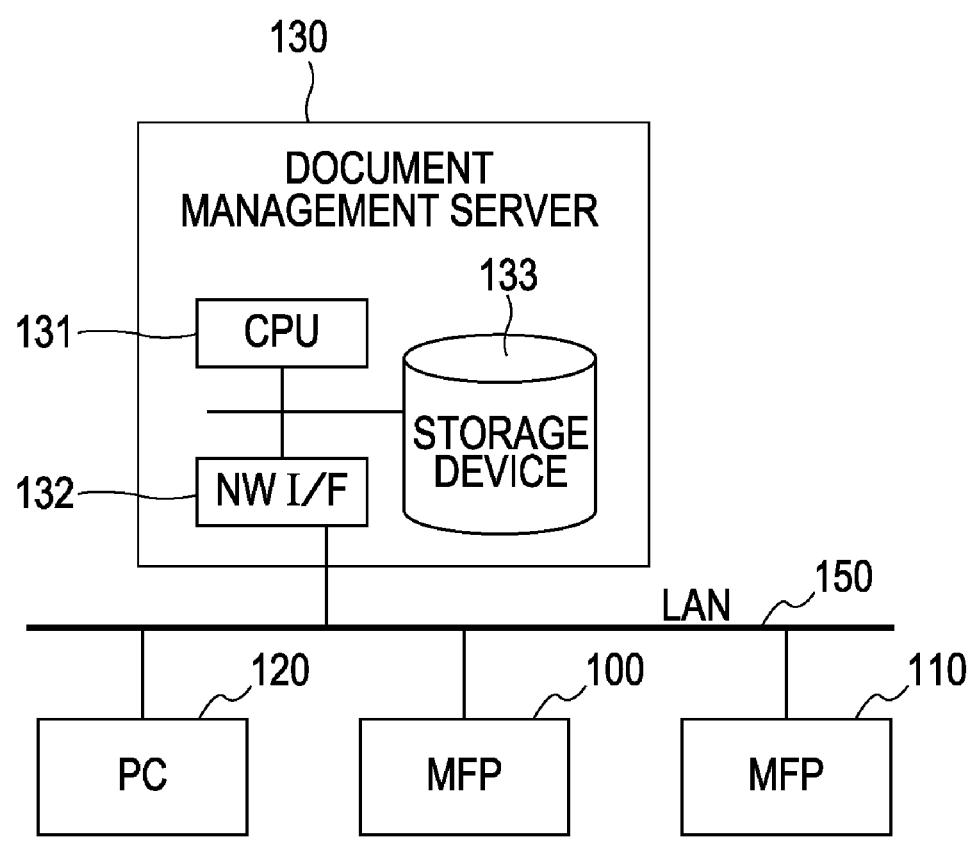
FIG. 1 is a configuration diagram of a document management system according to an exemplary embodiment of the present invention.

FIG. 1 is a configuration diagram of a document management system according to a first exemplary embodiment of the present invention. On a local area network (LAN) 150, a multi function peripheral (MFP) 100, another MFP 110, a PC 120, and a document management server 130 are mutually connected. Each terminal of the LAN 150 can perform mutual data communication and is also connected via the LAN 150 to the Internet.

The document management server 130 includes a storage device 133, such as a hard disk drive (HDD) and can store a plurality of documents. It should be noted that the documents stored in the storage device 133 are not necessarily text data formed of character codes, but may be bitmap images obtained by reading an image on an original by a scanner device of the MFP 100 as will be described below or may be image data of other format. A CPU 131 is configured to control the document management server 130 and reads out a program stored in a memory provided to the storage device 133 for operation.

When the CPU 131 receives a retrieval request of a document via a network I/F 132 from a terminal on the LAN 150 (for example, the MFP 100), the CPU 131 carries out a retrieval in accordance with a retrieval condition received together with the retrieval request while setting the documents stored in the storage device 133 as the retrieval targets. Then, after the completion of the retrieval, the CPU 131 notifies a terminal functioning as a retrieval requesting source via the network I/F 132, of the total number of the documents included in the retrieval results and index information of each document (i.e., the document name, total page number, the save date and time, etc.).

Figure 2:
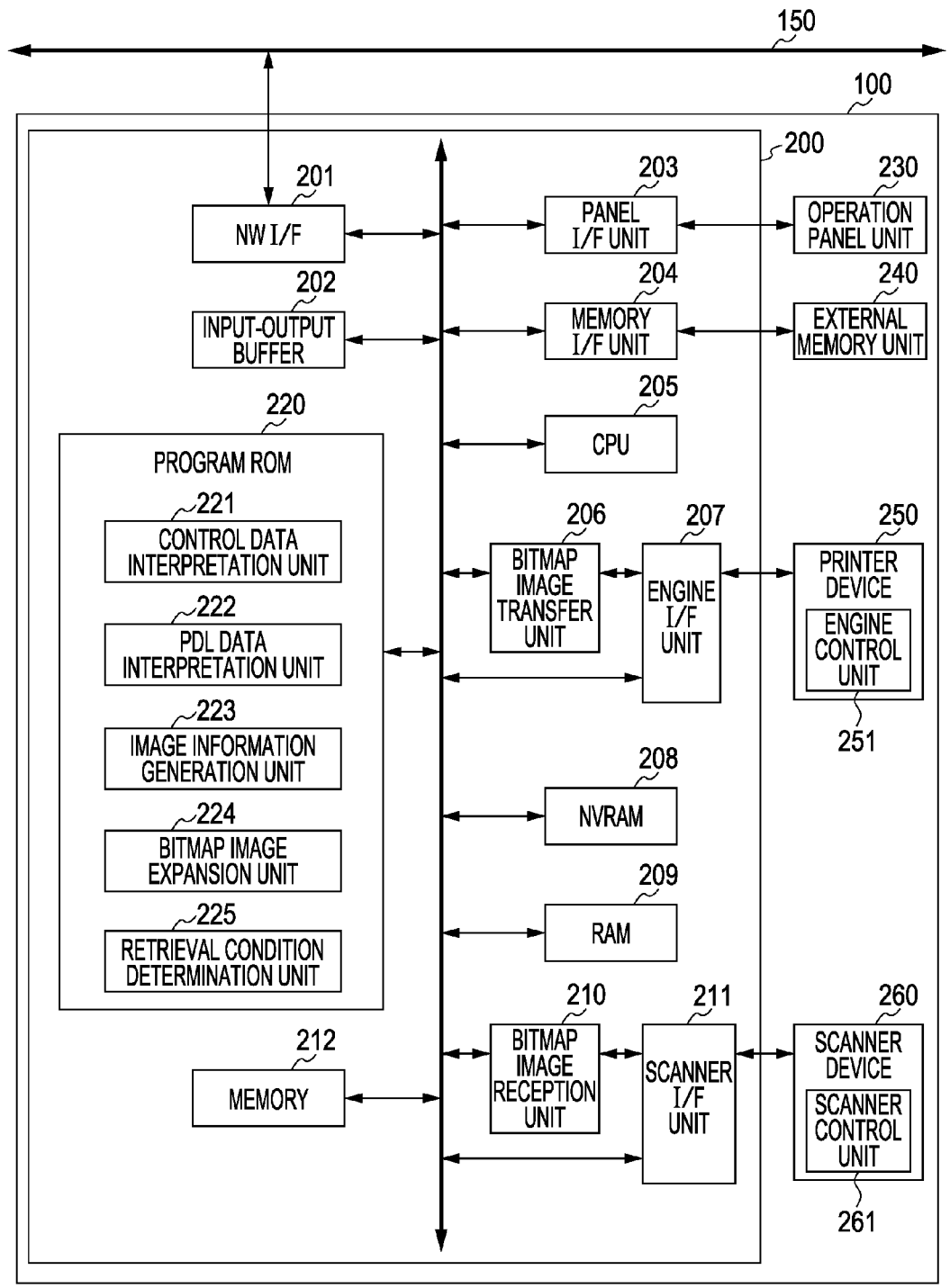
FIG. 2 is a system block diagram of an MFP according to an exemplary embodiment of the present invention.

FIG. 2 is a system configuration diagram of the MFP 100. The MFP 100 can read and input an image on an original for printing, saving, or sending the image data to another external device. The MFP 100 is includes a control unit 200 for controlling the MFP 100, a printer device 250 for printing an output image on a recording sheet, and a scanner device 260 for reading an image from an original and inputting the data as image data into the MFP 100.

The control unit 200 communicates with external devices, i.e., PC 120, document management server 130, via a network I/F 201. An input-output buffer 202 is configured to send and receive a control code input from the network for printing, various pieces of page description language (PDL) data, or various pieces of data related to the MFP 100. A CPU 205 is configured to control operations of the MFP 100. A program ROM 220 stores a program for describing an operation of the CPU 205. The CPU 205 reads out the program stored in the program ROM 220 to execute the program, thus realizing the various functions of the MFP 100.

An RAM 209 is utilized as a work memory for interpretation and printing of the control code and data, a calculation for image reading, and a process of the image data to be input and output. A non-volatile RAM (NVRAM) 208 stores data necessary to be held even when a power source for the MFP 100 is interrupted. A control data interpretation unit 221 and a PDL data interpretation unit 222 in the program ROM 220 respectively perform an interpretation of print control data and PDL data received from an external device, i.e., PC 120. An image information generation unit 223 is configured to generate various image objects. A bitmap image expansion unit 224 is configured to expand the image objects into bitmap image data. A retrieval condition determination unit 225 is configured to determine whether a retrieval condition input by the user in the operation panel unit 230 is appropriate.

A bitmap image transfer unit 206 is configured to transfer the bitmap image expanded by the bitmap image expansion unit 224 and the bitmap image obtained by reading the image on the original from the scanner device 260, to the printer device 250. An engine I/F unit 207 is an interface for connecting the bitmap image transfer unit 206 and an engine control unit 251 of the printer device 250 with each other.

A bitmap image reception unit 210 is configured to receive the bitmap image read by the scanner device 260. A scanner I/F unit 211 is an interface for connecting a scanner control unit 261 of the scanner device 260 and the bitmap image reception unit 210 with each other.

An operation panel unit 230 is configured to accept an operation instruction from a user, or to display an error notice or various process results, an operation guide, etc. A panel I/F unit 203 is an interface for connecting the operation panel unit 230 and the control unit 200 with each other. An external memory unit 240 can store the print data, image data obtained from the outside, various pieces of information related to the apparatus, etc. The external memory unit 240 is connected via a memory I/F unit 204 to the control unit 200.

Figure 3:
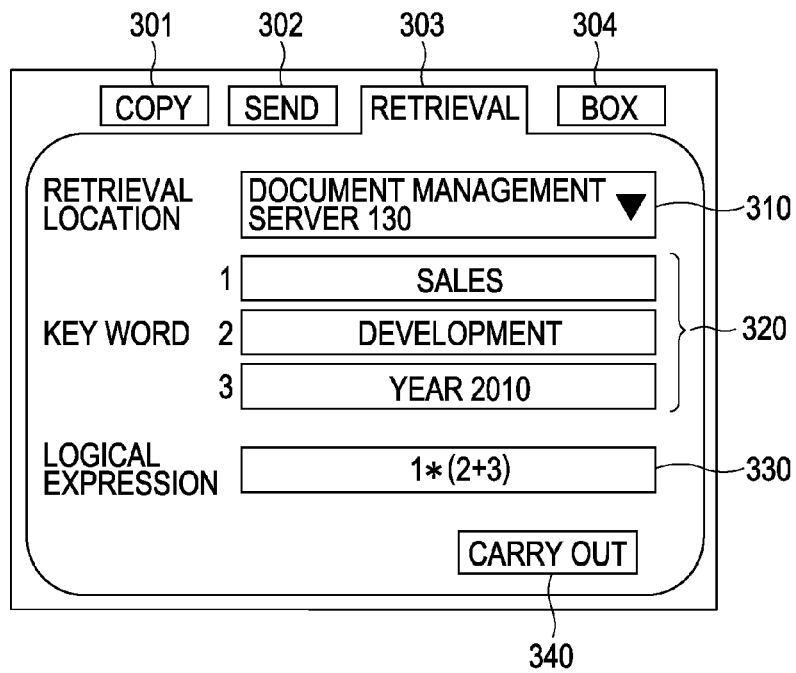
FIG. 3 illustrates a retrieval condition input screen on an operation panel unit according to an exemplary embodiment of the present invention.

FIG. 3 illustrates a retrieval condition input screen displayed on a liquid crystal display unit that is provided to the operation panel unit 230. The MFP 100 can switch over various modes of the MFP 100 by selecting mode keys 301 to 304. In the case of selecting the mode key 301, "copy mode" is selected. The copy mode refers to a mode of performing a copy process in which the image data obtained by reading the image with use of the scanner device 260 is printed by the printer device 250.

In the case of selecting the mode key 302, "send mode" is selected. The send mode refers to a mode of performing a sending process in which the image data obtained by reading the image with use of the scanner device 260 is attached to an electronic mail or the like and the image data is sent to an external device via the LAN 150. In the case of selecting the mode key 304, "box mode" is selected. The box mode refers to a mode of performing a storage process in which the image data obtained by reading the image with use of the scanner device 260 is stored in a storage area (box) provided to a MEMORY 212 or stored in a storage area provided to other device on the LAN 150.

The screen illustrated in FIG. 3 is a screen displayed when a retrieval mode is selected. The retrieval mode refers to a mode of performing a retrieval process in which, from the plurality of documents stored in the HDD 133 of the document management server 130, a retrieval of a document desired by the user is carried out. On the retrieval condition input screen illustrated in FIG. 3, it is possible for the user to input a retrieval condition for carrying out the retrieval of the desired document. In a retrieval location specification field 310, a storage device where the document desired to be set as the retrieval target is stored is specified. Herein, it is understood that the document management server 130 is selected. When a ▼ mark is selected at the right hand corner of the retrieval location specification field 310, other options that can be specified as retrieval locations are displayed in a combo box.

In a key word specification field 320, it is possible to input three types of character strings. This character string is a retrieval key word used as the retrieval condition. When, for example, a character string "sales" is specified, documents including the character string "sales" in texts are hit as a retrieval result. It should be noted that "hit as the retrieval result" means that the document conforming to the condition specified as the retrieval condition is identified by a retrieval engine that carries out the retrieval and, for example, index information including those document names are notified. While the present embodiment allows three types of character strings to be inputted, the present invention is not limited to three and any number that would enable practice of the present invention is applicable.

Subsequently, it is possible to input a retrieval logical expression which uses an operator for representing a combination of the character strings input in the key word specification field 320 in a logical expression specification field 330. For example, "*" shown in FIG. 3 is an AND operator, which forms a retrieval condition by combining character strings on both adjacent sides with an AND condition. "+" is an OR operator, which forms a retrieval condition by combining character strings on both adjacent sides with an OR condition. In the logical expression illustrated in FIG. 3, character strings "development" and "year 2010" are combined under an OR condition, and further the result and a character string "sales" are combined under an AND condition. When only one type of a key word is specified, a logical expression "1" can be created without using any operator. The specification method of the logical expression may be any method other than the above-described methods that would enable practice of the present invention.

It should be noted herein that the description has been made of a case where the character string included in the document desired to be retrieved is specified as the condition for carrying out the document retrieval, but other items may be used as the retrieval condition. For example, a document name, or a creator of the document desired to be retrieved, or a date when the document is stored in the storage medium may be specified as the retrieval condition. When the input of the retrieval condition in the screen illustrated in FIG. 3 is completed, by selecting a carry out button 340, the CPU 205 sends a retrieval request including the input retrieval condition via the network I/F 201 to the document management server 130.

Figure 4:
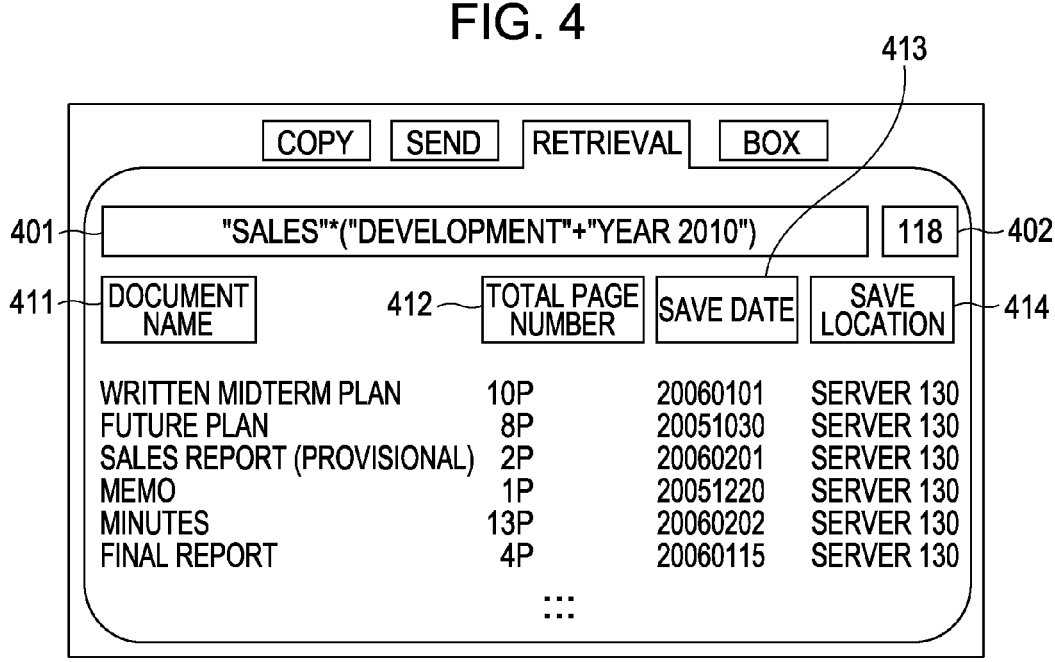
FIG. 4 illustrates a retrieval result display screen on the operation panel unit according to an exemplary embodiment of the present invention.

FIG. 4 illustrates a retrieval result display screen displayed in the operation panel unit 230 based on the retrieval result information notified from the document management server 130. A retrieval condition display field 401 is provided at an upper part of this screen. The retrieval condition input in the screen illustrated in FIG. 3 is displayed in a form in which a key word and a logical expression are combined with each other. A hit document number display field 402 displays the number of documents which are included in the retrieval results.

In the example of FIG. 4, as the result of carrying out the retrieval with use of the retrieval condition displayed in the retrieval condition display field 401, 118 documents are included in the retrieval results. Also, the retrieval result display screen displays index information of the documents included in the retrieval results in the form of a list together with information corresponding to items 411 to 414. Items 411 to 414 respectively represent a document name, the number of pages in the document, a save date of the document, and a save location of the document.

In a case where a large number of documents are included in the retrieval results according to the first exemplary embodiment, to address a problem of for carrying out a retrieval again with use of a further narrowed down retrieval condition, a determination as to whether the input retrieval condition is appropriate is performed. For example, an upper limit number of the number of documents included in the retrieval result is previously set as 100. In this case, in the example of FIG. 4, the number of documents included in the retrieval results exceeds the upper limit number and thus, the retrieval condition "sales"*("development"+"year 2010") is determined as not an appropriate retrieval condition.

Figure 5:
FIG. 5 illustrates a record configuration of retrieval condition identification information according to an exemplary embodiment of the present invention.

The retrieval condition which is not appropriate, that is, the retrieval condition determined as a retrieval condition with which a larger than the previously set upper limit number of documents are obtained when the retrieval is carried out with use of the retrieval condition is managed in the MEMORY 212 while a configuration illustrated in FIG. 5 is used.

FIG. 5 illustrates information for identifying a retrieval condition (retrieval condition identification information) with includes a larger number of documents in the retrieval results than the upper limit number of documents. The retrieval condition identification information is managed as one record for each retrieval condition as illustrated in FIG. 5. When a retrieval is carried out, each time the number of retrieved documents is larger than the upper limit number of documents, a new record is added. The respective records include information related to retrieval conditions in areas 501 to 505.

Area 501 stores information indicating the retrieval condition. Area 502 stores, information indicating a date and time when the retrieval using the retrieval condition stored in the area 501 is carried out. Area 503 stores information indicating the number of documents which are included in the retrieval results. Area 504 stores information indicating the most recent date and time when a content of a record is updated after the record is created. Area 505 stores information indicating the total number of documents stored in a HDD 133 of the document management server 130 when the record is created or updated.

Next, with use of flowcharts of FIGS. 6 to 8, based on the retrieval condition identification information illustrated in FIG. 5, a description will be given of an operation related to a process of determining, before the retrieval is carried out, whether the retrieval condition input by the user is an appropriate retrieval condition based on the past retrieval results.

Figure 6:
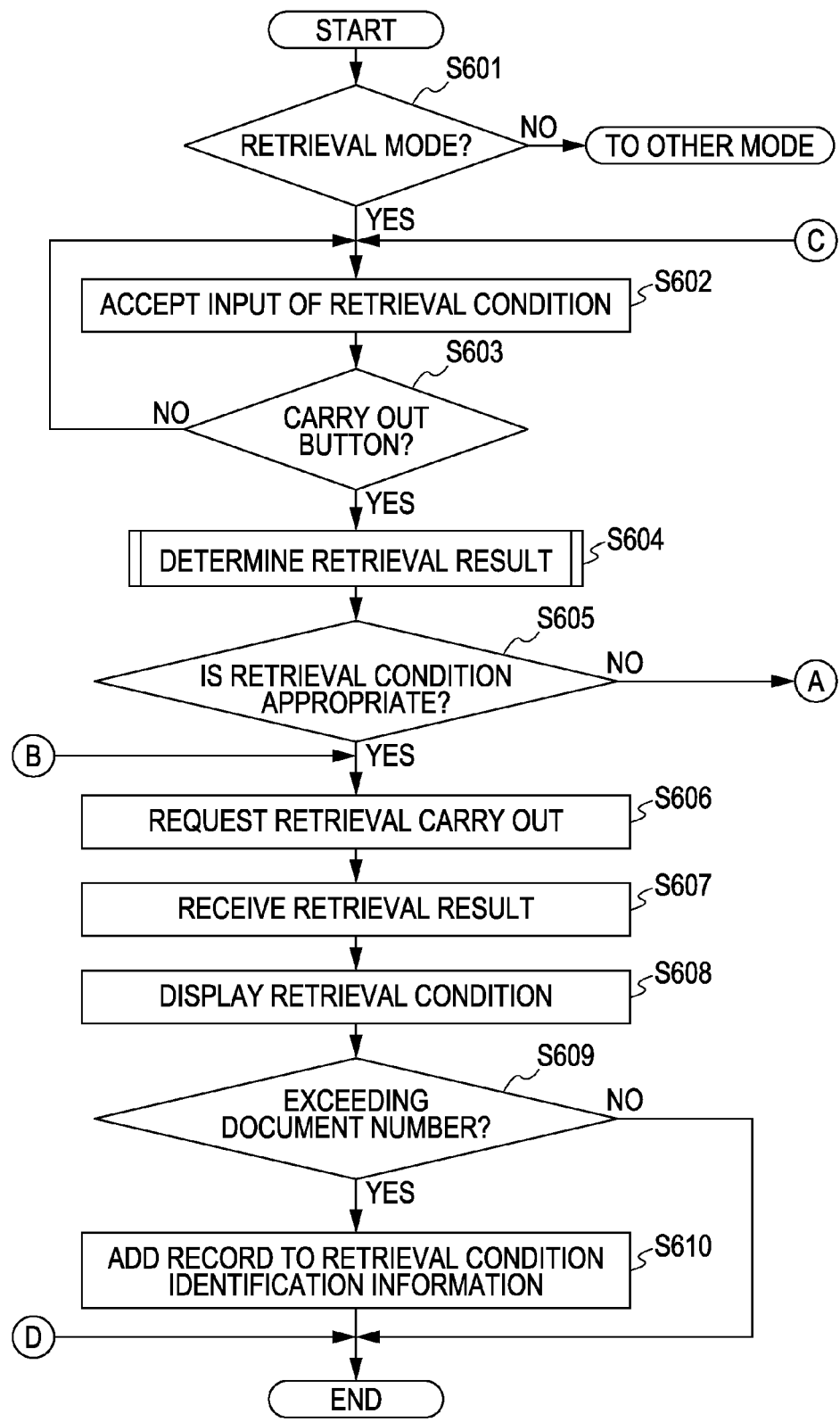
FIG. 6 is a flowchart describing a series of processes for carrying out a retrieval and managing the retrieval condition identification information based on the retrieval result according to an exemplary embodiment of the present invention.

FIG. 6 is a flowchart related to an operation for determining whether the input retrieval condition is appropriate and carrying out the retrieval when it is determined that the input retrieval condition is appropriate. In addition, the operation of FIG. 6 also identifies the retrieval condition in a case where the number of retrieved documents is larger than the upper limit number of documents.

First, in step S601, it is determined whether the retrieval mode is selected by a user. If the retrieval mode is selected, the process advances to step S602, where the retrieval condition input screen illustrated in FIG. 3 is displayed and the input of the retrieval condition by the user is accepted. If, in step S601, a mode other than the retrieval mode is selected, the mode is shifted to the corresponding mode.

Next, in step S603, it is determined whether the carry out button 340 is selected. When it is determined that the carry out button 340 is selected, the process advances to step S604 to determine whether the input retrieval condition is appropriate. Subsequently, in step S605, based on the result of the determination in step S604, it is determined whether the retrieval condition is appropriate. When it is determined that the retrieval condition is appropriate, the process advances to step S606. It should be noted that "appropriate retrieval condition" according to the present embodiment is a retrieval condition where number of documents in the retrieval results are no larger than the previously set upper limit number of documents when the retrieval is carried out with use of the retrieval condition.

In step S606, the retrieval carry out request including the input retrieval condition is sent to the document management server 130. Subsequently, in step S607, the retrieval result notified from the document management server 130 (including the total number of documents and index information of those documents) is received. Then, in step S608, the result is displayed on the operation panel unit 230. It should be noted that after that, although not described in the flowchart, if the user selects a document based on the index information displayed on the operation panel unit 230, it is possible to download the document from the document management server 130 and send the document to another device.

In step S609, it is determined whether the total number of documents notified as the retrieval result from the document management server 130 exceeds the upper limit number. Herein, "upper limit number" refers to a number which is previously set in an administrator mode, and can be set as an arbitrary integer N, where N>0.

In step S609, when it is determined that the number of documents included in the retrieval result exceeds the upper limit number, then in step S610, a record is created as the retrieval condition identification information illustrated in FIG. 5, and the retrieval condition used for this retrieval is stored and managed in the MEMORY 212.

This information is managed as information for determining whether the input retrieval condition is appropriate in order to avoid inputting the same retrieval condition again for carrying out the retrieval and receiving a large number of documents in the retrieval results. When, in step S609, the retrieval result is below the upper limit number or in step S610 after the record of the retrieval condition identification information is created, the process ends.

Figure 7:
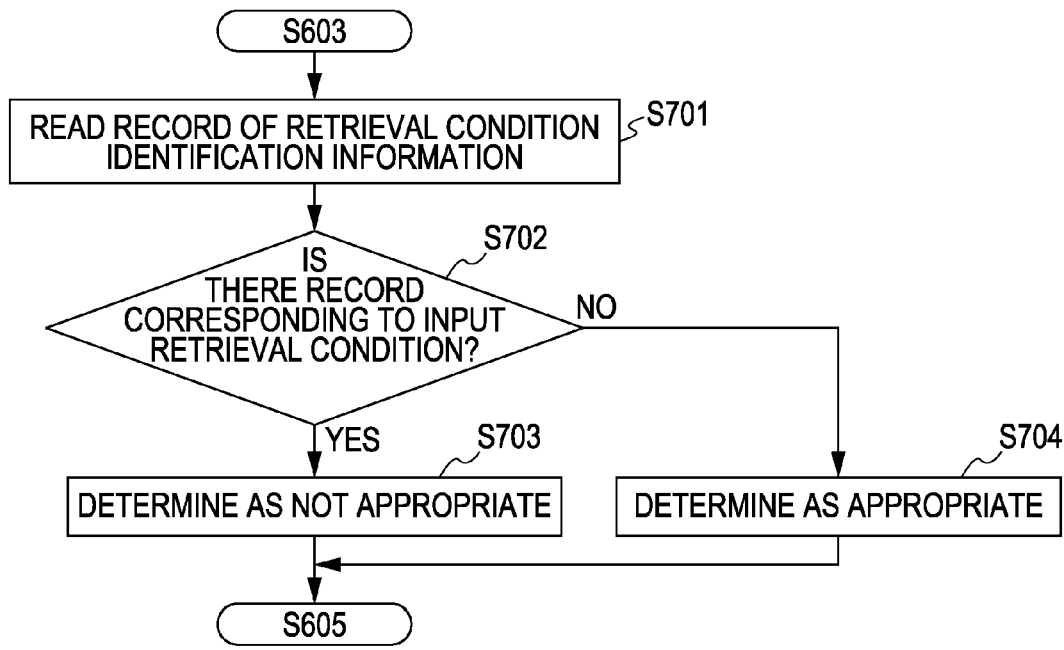
FIG. 7 is a flowchart describing a series of processes for determining whether the retrieval condition is appropriate according to an exemplary embodiment of the present invention.

FIG. 7 is a flowchart describing a process for determining the retrieval condition input in step S604 of FIG. 6. First, in step S701, the retrieval condition identification information managed in the MEMORY 212 is read out. Then, in step S702, it is determined whether a record of the retrieval condition matched to the retrieval condition input in step S602 exists in the retrieval condition identification information read out in step S701. When the relevant record exists, the process advances to step S703 to determine that the input retrieval condition is not appropriate. On the other hand, when the relevant record does not exist, the process advances to step S704 to determine that the input retrieval condition is appropriate.

Figure 8:
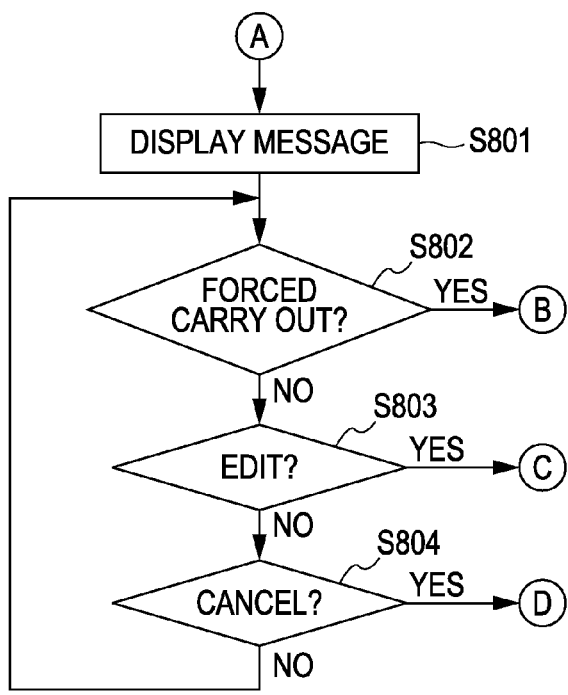
FIG. 8 is a flowchart describing a series of processes executed in a case where it is determined that the retrieval condition is not appropriate according to an exemplary embodiment of the present invention.
Figure 9:
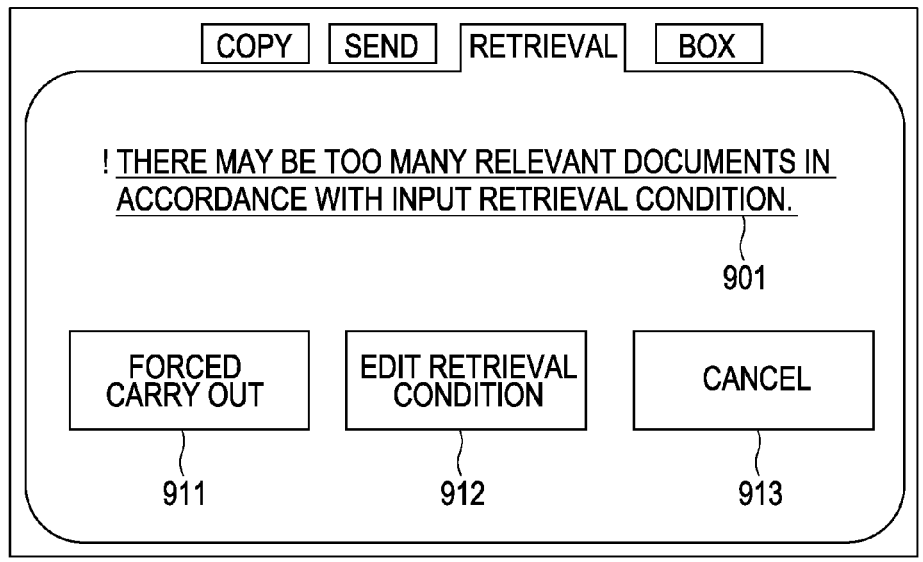
FIG. 9 illustrates a warning display screen of the operation panel unit according to an exemplary embodiment of the present invention.

FIG. 8 is a flowchart describing an operation in a case where it is determined in step S605 that the retrieval condition is not appropriate. First, in step S801, a screen illustrated in FIG. 9 is displayed on the operation panel unit 230. The screen illustrated in FIG. 9 is a screen for notifying the user that the retrieval with use of the input retrieval condition should not be carried out. That is, this screen is for warning that if the retrieval condition is used for carrying out the retrieval, there is a possibility that the number of documents included in the retrieval results could be larger than the upper limit number of documents.

In step S802 of FIG. 8, it is determined whether the button 911 in FIG. 9 is selected. The button 911 is a button selected when the user desires to carry out the retrieval with use of the input retrieval condition as is. When the button 911 is selected, the process advances to step S606 illustrated in FIG. 6 to start a retrieval process.

In Step s802, if it is determined that the button 911 is not selected, the process advances to step S803, where it is determined whether the button 912 in FIG. 9 is selected. The button 912 is a button selected when the user desires to edit (re-input) the retrieval condition previously input by the user in response to the warning displayed on the screen illustrated in FIG. 9. When the button 912 is selected, the process returns to step S602 illustrated in FIG. 6, where the re-input of the retrieval condition is accepted.

If it is determined in step S803 that the button 912 is not selected, the process advances to step S804, where it is determined whether the button 913 in FIG. 9 is selected. The button 913 is a button selected when the user cancels carrying out the retrieval process in response to the warning displayed on the screen illustrated in FIG. 9. If it is determined that the button 913 is selected, the process ends. It should be noted that when, in step S804, it is determined that the button 913 is not selected, the process returns to step S802 to perform the monitoring until one of the buttons 911 to 913 is selected.

In this way, when the retrieval condition is not appropriate in step S605 of FIG. 6, that is, when the retrieval is carried out with use of the retrieval condition if it is determined that the number of documents in the retrieval results is larger than the upper limit number of documents, such a control is executed that the retrieval is not carried out with use of the retrieval condition. It should be noted that "such a control is executed that the retrieval is not carried out" refers to a control on the display of the operation panel unit 230 by using the screen illustrated in FIG. 9 to issue a warning indicating that the input retrieval condition is not appropriate.

With this configuration, the user can find out that too many documents would be included in the retrieval results with use of the retrieval condition input by the user before carrying out the retrieval. Thus, it is possible to avoid unnecessarily carrying out the retrieval.

With the provision of the button 911, even when "the retrieval condition that is not appropriate" is determined, it is possible for a user to forcedly carry out the retrieval. With this configuration, for example, when the information used for the source of this determination is old, there is a possibility that the number of documents included in the retrieval results with use of the retrieval condition is changed. Thus it is possible to decide whether or not the retrieval is carried out by the user.

In addition, as the content of "such a control is executed that the retrieval is not carried out", when it is determined that the input retrieval condition is not appropriate, such a control may be performed that the retrieval with use of the retrieval condition is prohibited. With this configuration, the retrieval with use of the retrieval condition can be avoided, thus making it possible to reduce the load on the retrieval engine which actually performs the retrieval process or the network for communicating the information such as the retrieval request and the retrieval result. In this case, the button 911 is not displayed and only the buttons 912 and 913 are displayed on the screen illustrated in FIG. 9.

Also, according to the present embodiment, while the description has been given of the example in which in order to carry out the retrieval while setting the documents stored in the document management server 130 on the network as the retrieval target, the retrieval request is sent to the document management server 130, another mode may also be adopted. For example, in the retrieval location specification field 310 on the screen illustrated in FIG. 3, when the MEMORY 212 in the MFP 100 is specified, a document retrieval unit that is provided to the MFP 100 and has a similar function to that of the document management server 130 carries out the retrieval in accordance with the input retrieval condition.

According to the present embodiment, if the number of documents included in the retrieval results is larger than the upper limit number of documents after the retrieval with use of the input retrieval condition, information for identifying the retrieval condition is stored and managed in the MEMORY 212. Then, when the user inputs the retrieval condition, based on the managed information, it is determined whether the retrieval condition is appropriate, that is, it is determined whether the retrieval condition is such a condition that the number of documents included in the retrieval results is larger than the upper limit number of documents if the retrieval is carried out with use of the retrieval condition. Furthermore, as a result of this determination, when it is determined that the input retrieval condition is not appropriate, such a control is executed that the retrieval is not carried out with use of the retrieval condition.

With this configuration, for example, it is possible to avoid carrying out the retrieval by using the retrieval condition again with which a large number of documents are included in the retrieval results when the retrieval was carried out in the past. In other words, the user can find out whether the retrieval condition input by itself is appropriate before the retrieval process is carried out and does not need to wait for a period of time during which a retrieval is carried out each time a retrieval expression is input. Also, by avoiding unnecessary processing, it is possible to avoid imparting an unnecessary load on the retrieval engine or the network.

A second exemplary embodiment of the present invention differs from the first exemplary embodiment as follows. According to the first embodiment, the description has been given of the case where one storage device is specified as the retrieval location for carrying out the retrieval. On the other hand, according to the second exemplary embodiment, a plurality of storage devices are specified for performing the retrieval requests at the same time. Also, the record of the above-mentioned retrieval condition identification information is managed for each of the storage devices. The fundamental configuration according to the present embodiment is similar to that of the first embodiment. Herein, with regard to the present embodiment, only a different part from the first embodiment will be described.

Figure 10:
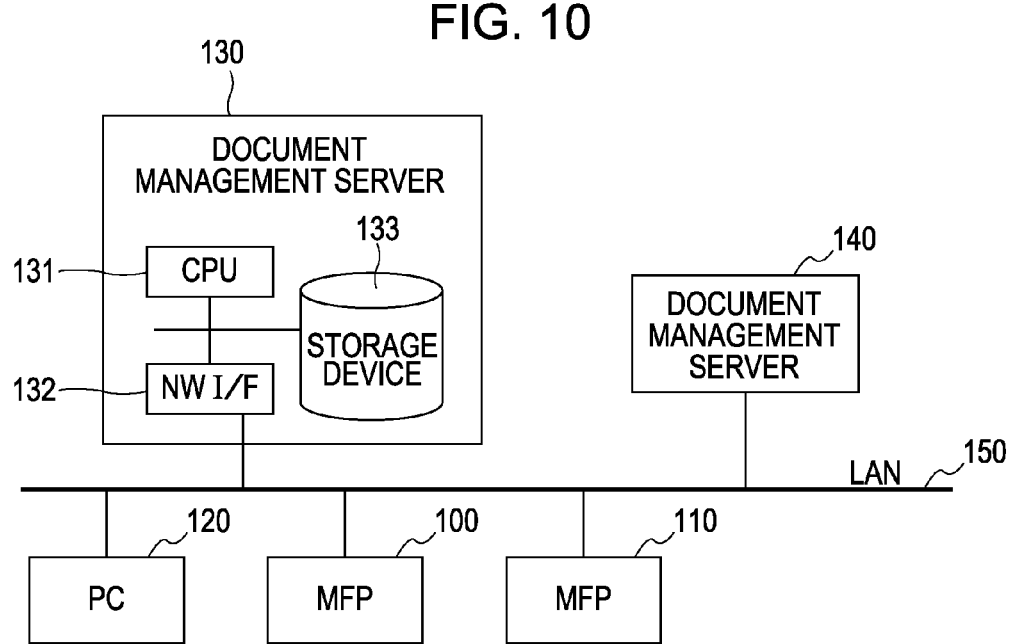
FIG. 10 is a configuration diagram of a document management system according to an exemplary embodiment of the present invention.

FIG. 10 is a configuration diagram of a document management system according to the present embodiment. Herein, as compared with the configuration diagram illustrated in FIG. 1, the LAN 150, the MFP 100, the MFP 110, the PC 120, and the document management server 130 are similarly provided. In addition, a document management server 140 having a similar function to that of the document management server 130 is also provided.

Figure 11:
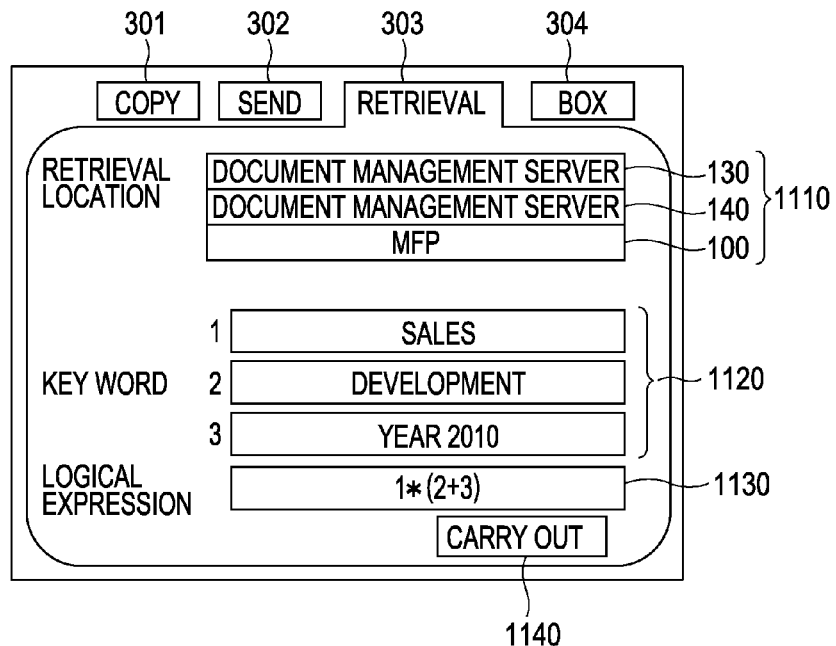
FIG. 11 illustrates a retrieval condition input screen on an operation panel according to an exemplary embodiment of the present invention.

FIG. 11 illustrates a retrieval condition input screen according to the present embodiment. In the present embodiment, it is possible to specify a plurality of storage devices in a retrieval location specification field 1110 as the retrieval location. At this time, when a plurality of storage devices is specified, in order to carry out the retrieval, the retrieval requests are performed to the storage devices at the same time. Each of the retrieval results provided by the storage devices includes index information of documents included in the retrieval results and information indicating the number of documents in the respective storage devices.

Figure 12:
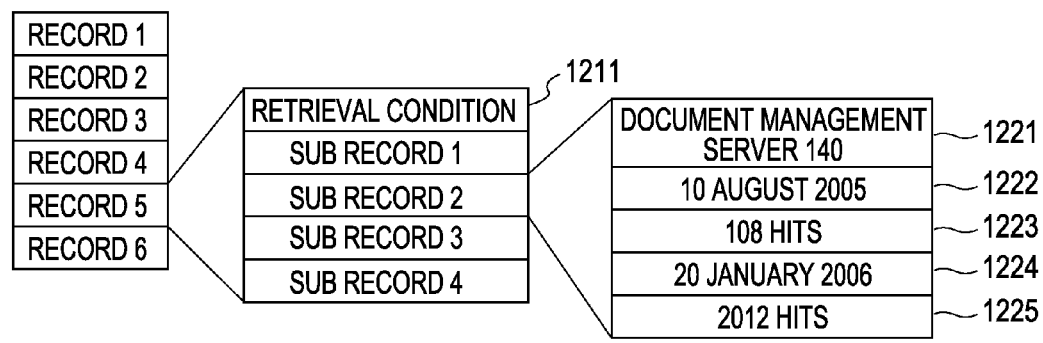
FIG. 12 illustrates a record configuration of the retrieval condition identification information according to an exemplary embodiment of the present invention.

According to the present embodiment, in a case where the number of documents in the retrieval results is than the upper limit number of documents, information for identifying the retrieval condition used for the retrieval is distinctly managed for each of the storage devices. FIG. 12 illustrates a record configuration of the retrieval condition identification information according to the present embodiment.

For this retrieval condition identification information, a record is newly created and added in a case where a retrieval is carried out while one or a plurality of storage devices are specified and the total number of documents included in the retrieval results exceeds the upper limit number. Each of the recoded includes a plurality of sub records (1 to 4) together with the retrieval condition (1211). Furthermore, for each of the sub records, information indicating the storage device which has carried out the retrieval is stored in an area 1221. Areas 1222 to 1225 are respectively similar to the areas 502 to 505 in FIG. 5 and a description thereof will be omitted. It should be noted that the number of the sub records to be created corresponds to the number of the storage devices specified in the retrieval location specification field 1110 of FIG. 11.

Next, with reference to FIG. 6, a description will be given of an operation according to the present embodiment. In the case where the operation is similar to that previously described with respect to the first embodiment, a detailed description will be omitted herein.

In step S602, an input of the retrieval condition which is the retrieval condition input by the user via the screen illustrated in FIG. 11 is accepted, and also in which one or a plurality of storage devices are specified as the retrieval location. In step S606, the retrieval requests are performed with respect to the storage devices specified as the retrieval location at the same time. Then, in step S607, the retrieval result information indicating the index information and the number of documents included in the retrieval results is received from the storage devices. In step S609, the total number of documents included in the retrieval results in the respective storage devices is calculated, and it is determined whether the calculated total number exceeds the upper limit number. When the number of documents included in the retrieval results is larger than the upper limit number of documents, a record including a sub record for each storage device is added in step S610 and managed as the retrieval condition identification information.

Figure 13:
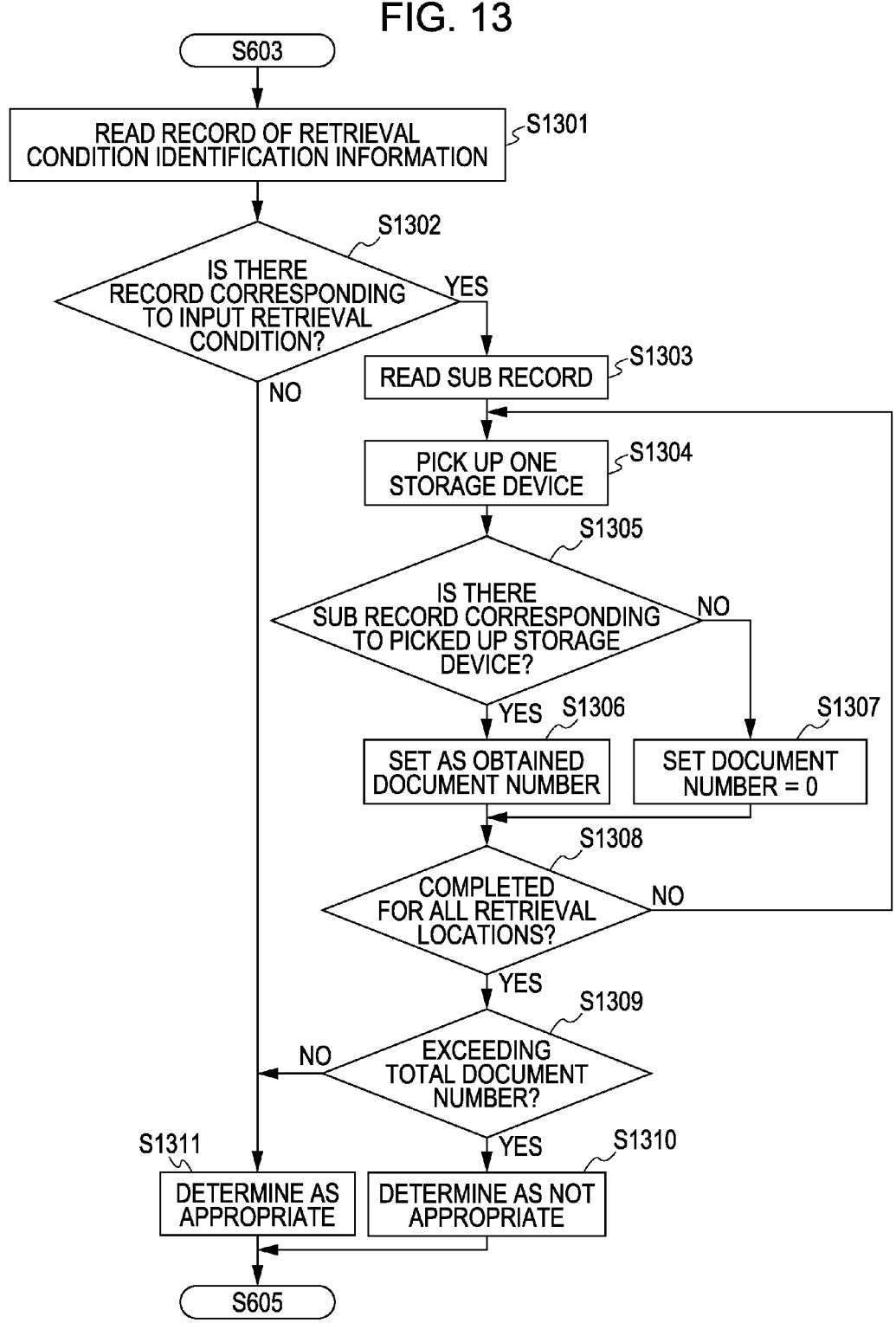
FIG. 13 is a flowchart describing a series of processes for determining whether the retrieval condition is appropriate according to an exemplary embodiment of the present invention.

FIG. 13 is a flowchart describing a process for determining the input retrieval condition in step S604 according to the present embodiment.

First, in step S1301, each of the records included in the retrieval condition identification information that is managed in the MEMORY 212 is read out. Next, in step S1302, the input retrieval condition is compared with the retrieval condition included in each record to determine whether a record including the retrieval condition matches the input retrieval condition. When the relevant record does not exist, the process advances to step S1311, where it is determined that the input retrieval condition is appropriate. Then the process returns to the flowchart of FIG. 6.

When, in step S1302, it is determined that the relevant record exists, the process advances to step S1303 to read out each sub record included this record. Next, in Step S1304, information indicating the storage device specified in the input retrieval condition is obtained. Then, in step S1305, it is determined whether the sub record including information that indicates the storage device matching to the storage device indicated by the picked up information exists.

When the relevant sub record exists, in step S1306, the information indicating the number of documents stored in an area 1223 of the sub record is read out and set. When it is determined that the relevant sub record does not exists, the process advances to step S1307 to set the document number as 0. Then, in Step S1308, it is determined whether the process in steps S1304 to S1307 is completed for all the specified storage devices. When it is determined that the process is not completed, the process returns to step S1304. When the process is completed, the process advances to step S1309 to determine whether the total number of document numbers set in steps S1306 and Step S1307 exceeds the upper limit number.

As a result of this determination, when the number exceeds the upper limit number, the process advances to step S1310 to determine that the input retrieval condition is not appropriate. As a result of the determination in step S1309, when the number does not exceed the upper limit number, the process advances to step S1311 to determine that the input retrieval condition is appropriate.

It should be noted that, according to the present embodiment, in the process in step S610 of FIG. 6, a record corresponding to the retrieval condition used for the retrieval is not newly created in some cases. That is, for example, in step S1311 via step S1309 in FIG. 13, when it is determined that the retrieval condition is appropriate, the retrieval is carried out even when the record already exists. At this time, the record of the retrieval condition identification information already managed may be updated. When a sub record corresponding to the storage devices specified as the retrieval location does not exist, the sub record may be newly created.

The above-described operation is required in the following case. For example, sub records corresponding to storage devices A (the number of documents: 40), B (the number of documents: 50), and C (the number of documents: 30) with respect to a certain retrieval condition are managed. It should be noted that numerals in the brackets indicate the number of documents included in the retrieval results as the result of carrying out the retrieval in the respective storage devices.

At this time, a case will be considered that storage devices A and D are specified as the retrieval location and the same retrieval condition is input thereto. When a determination is made, among documents stored in the storage device D, the number of documents included in the retrieval results is unknown. In step S1309, the total document number 40 does not exceed the upper limit number (=100). Then, after the retrieval is carried out with use of this retrieval condition, the process advances to step S610. In step S610, as the sub record in the retrieval location A already exists, the sub record may be updated or may be skipped without the update and as a sub record in the retrieval location D does not exists, the sub record is newly created.

According to the present embodiment, the number of documents included in the retrieval results is managed for each storage device specified as the retrieval location. With this configuration, in addition to the effects as described in the first exemplary embodiment, even in a situation where the retrieval requests are performed with respect to a plurality of storage devices, it is possible to determine whether the input retrieval condition is appropriate.

Next, a third exemplary embodiment of the present invention will be described. A difference between the third exemplary embodiment and the first exemplary embodiment is as follows. According to the first embodiment, for the retrieval condition identification information, the record is managed for each retrieval condition including the key word and the logical expression. According to the third exemplary embodiment, the record is created and managed for each key word. The fundamental configuration according to the present embodiment is similar to that of the first embodiment. Herein, with regard to the present embodiment, only the difference(s) between the present embodiment and the first embodiment will be described.

Figure 14:
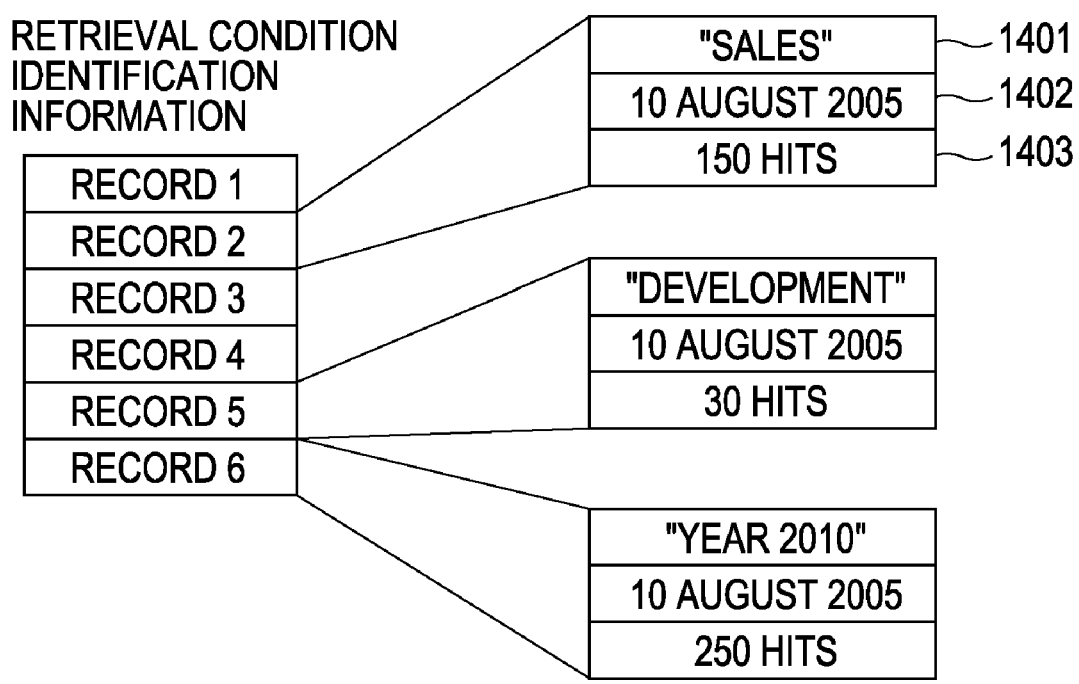
FIG. 14 illustrates a record configuration of the retrieval condition identification information according to an exemplary embodiment of the present invention.

FIG. 14 illustrates a record configuration of the retrieval condition identification information according to the present embodiment. FIG. 14 illustrates the retrieval condition identification information managed on the basis of the result with use of the retrieval condition input via the screen illustrated in FIG. 3. It is understood that the record is managed for each retrieval condition including the key word and the logical expression according to the first embodiment and the record is created and managed for each key word according to the present embodiment.

In an area 1401, information indicating the specified key word is stored. In an area 1402, information indicating a date when the retrieval with use of the key word stored in the area 1401 is carried out. In an area 1403, information indicating the number of documents that include the key word stored in the area 1401 is stored. In other words, the number of documents stored in the area 1403 means the number of documents included in the retrieval results in the case where only the key word stored in the area 1401 is specified as the retrieval condition. It should be noted that the information stored in the area 1403 is notified as the retrieval result for each key word from the document management server 130.

Figure 15:
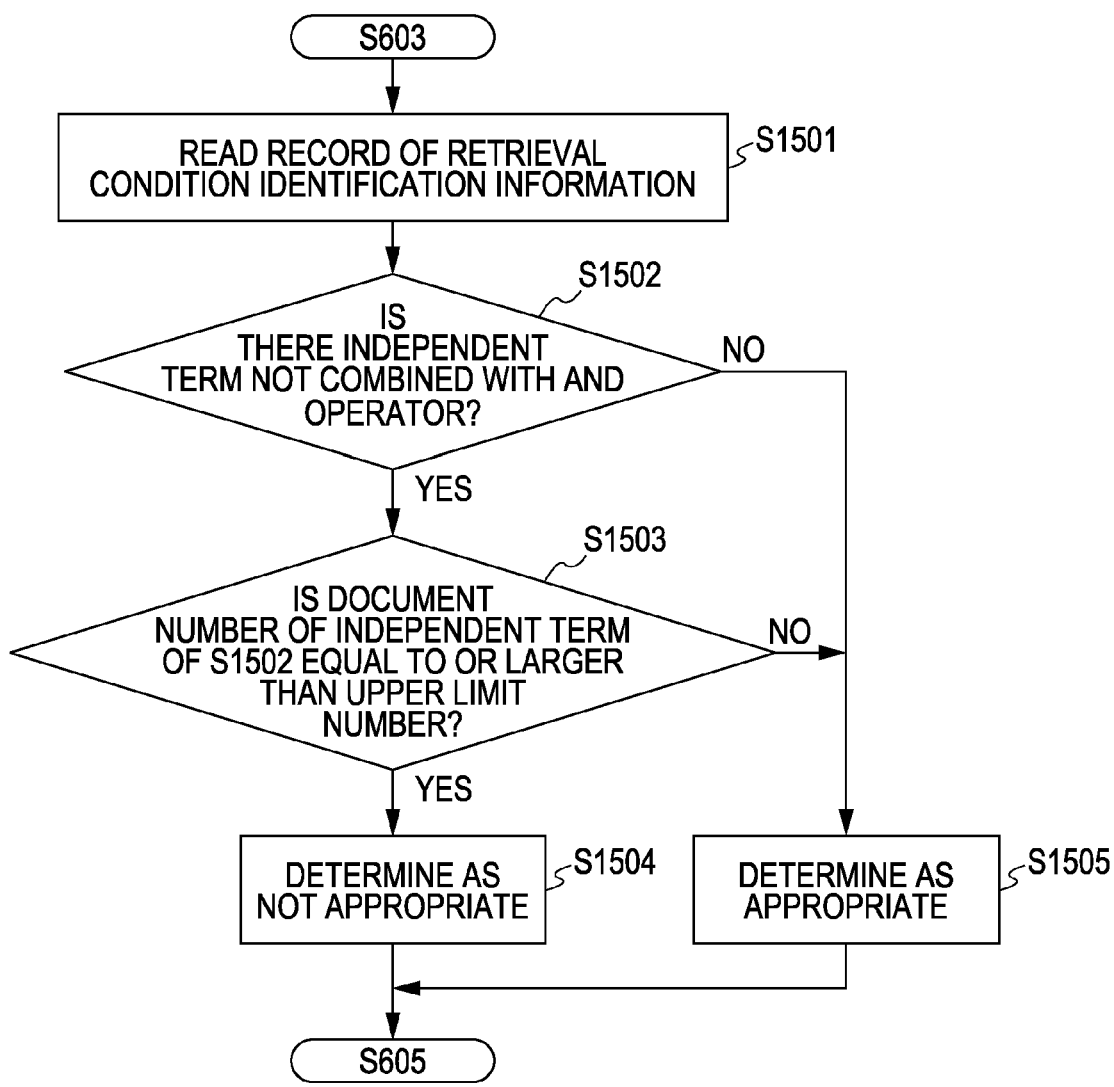
FIG. 15 is a flowchart describing a series of processes for determining whether the retrieval condition is appropriate according to an exemplary embodiment of the present invention.

FIG. 15 is a flowchart illustrating a process for determining whether the retrieval condition is appropriate in step S604 of FIG. 6 based on the retrieval condition identification information illustrated in FIG. 14.

First, in step S1501, the retrieval condition identification information stored in the MEMORY 212 is read out. Then, in step S1502, the logical expression input to the logical expression specification field 330 of FIG. 3 is interpreted to determine whether there is an independent term that is not combined with an AND operator ("*"). For example, in a case of the logical expression "A*B", both the A and B are combined with use of "*", and NO is determined in step S1502. In a case of "A+B*C", B and C are combined with use of "*", but A which is not directly combined with use of "*" exists, and YES is determined in step S1502. Furthermore, in a case of the logical expression "A*(B+C)", B and C are combined with A with use of "*" and NO is determined in step S1502. It should be noted that in a case where only "A" is specified as the logical expression, YES is determined in step S1502.

In step S1502, when it is determined that there is an independent term that is not combined with an AND operator ("*"), the process advances to step S1503, where it is determined whether the number of documents corresponding to the key work in the independent term identified in step S1502 exceeds the upper limit number. The number of documents used for this determination is obtained by referring to the information stored in the area 1403 of the record that is included in the retrieval condition identification information read out in step S1501.

As the result of the determination in step S1502, when the number of documents retrieved associated with the independent term is equal to or larger than the upper limit number of documents, the process advances to step S1504 to determine that the input retrieval condition is not appropriate. On the other hand, in step S1502, if the number of documents retrieved associated with the independent term is less than upper limit number of documents, the process advances to step S1505 to determine that the input retrieval condition is appropriate.

In the flowchart illustrated in FIG. 15, the input retrieval condition is determined not to be appropriate when an independent term not combined with the use of an AND operator exists in the logical expression and at the same time the number of documents included in the retrieval results exceeds the upper limit number with the key word in the independent term. That is, when the above-described independent term exists, whatever other key words and logical expressions exist, the number of documents included in the retrieval results unavoidably exceeds the upper limit number, thus resulting in a determination that the condition is not appropriate as the retrieval condition. It should be noted herein that the description has been given of the case where only "*" representing an AND condition and "+" representing an OR condition are used for the logical expressions. However, any operator that would enable performance of a logical expression is applicable.

According to the present embodiment, the record of the retrieval condition identification information is created and managed for each key word specified as the retrieval condition. With this configuration, in addition to the effects as described in the first embodiment, it is possible to determine whether or not the retrieval condition is appropriate. To be more specific, according to the first embodiment, in a case where the information for identifying the retrieval condition "A+B+C" is managed as the retrieval condition identification information, even when the retrieval condition "A+B*C" is input, it is determined that the relevant record does not exist. However, according to the present embodiment, A, B, and C are managed as the individual record. Therefore, even when the combinations of the logical expressions are different, if the record corresponding to each of the key words is managed, it is possible to determine whether or not the retrieval condition is appropriate.

Next, a fourth exemplary embodiment of the present invention will be described. The fourth exemplary embodiment of the present invention differs from the first exemplary embodiment as follows. According to the first embodiment, as a condition for determining whether or not the retrieval condition is appropriate, one upper limit number is set with respect to the number of documents to be included in the retrieval results. According to the fourth exemplary embodiment, two upper limit numbers are set. The fundamental configuration according to the present embodiment is similar to that of the first embodiment. Herein, with regard to the present embodiment, only the difference(s) between the present embodiment and the first embodiment will be described.

Figure 16:
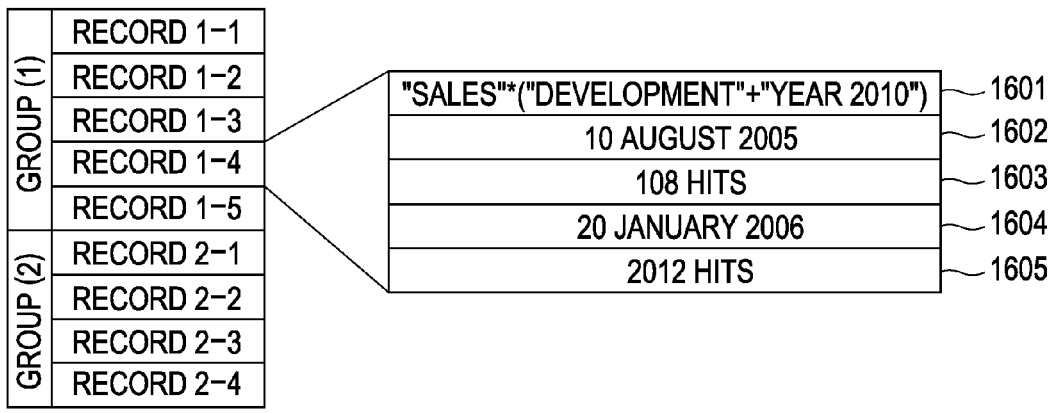
FIG. 16 illustrates a record configuration of the retrieval condition identification information according to an exemplary embodiment of the present invention.

FIG. 16 illustrates a record configuration of the retrieval condition identification information according to the present embodiment. As illustrated in FIG. 16, the record managed as the retrieval condition identification information is divided into a group (1) or a group (2). The group (1) reflects that when a retrieval is carried out with use of a retrieval condition identified by the record included in this group, the number of documents included in the retrieval results is larger than a first upper limit number (hereinafter, referred to as prohibition upper limit number). The group (2) reflects that when a retrieval is carried out with use of a retrieval condition identified by the record included in this group, the number of documents included the retrieval results is not larger than the prohibition upper limit number, but is larger than a second upper limit number (warning upper limit number), which is smaller than the prohibition upper limit number. It should be noted that these upper limit numbers may be arbitrarily set by a user in advance or may be set by a system administrator who manages the document retrieval system.

In this way, according to the present embodiment, as a result of carrying out the retrieval, when the number of documents included in the retrieval results is greater than or equal to a set number of documents, classification of two groups is made in accordance with the number of retrieved documents and this is managed as the record of the retrieval condition identification information. It should be noted that the contents to be stored in areas 1601 to 1605 of each record are similar to the contents of information stored in the areas 501 to 505 of FIG. 5, and thus a description thereof is omitted.

Figure 17:
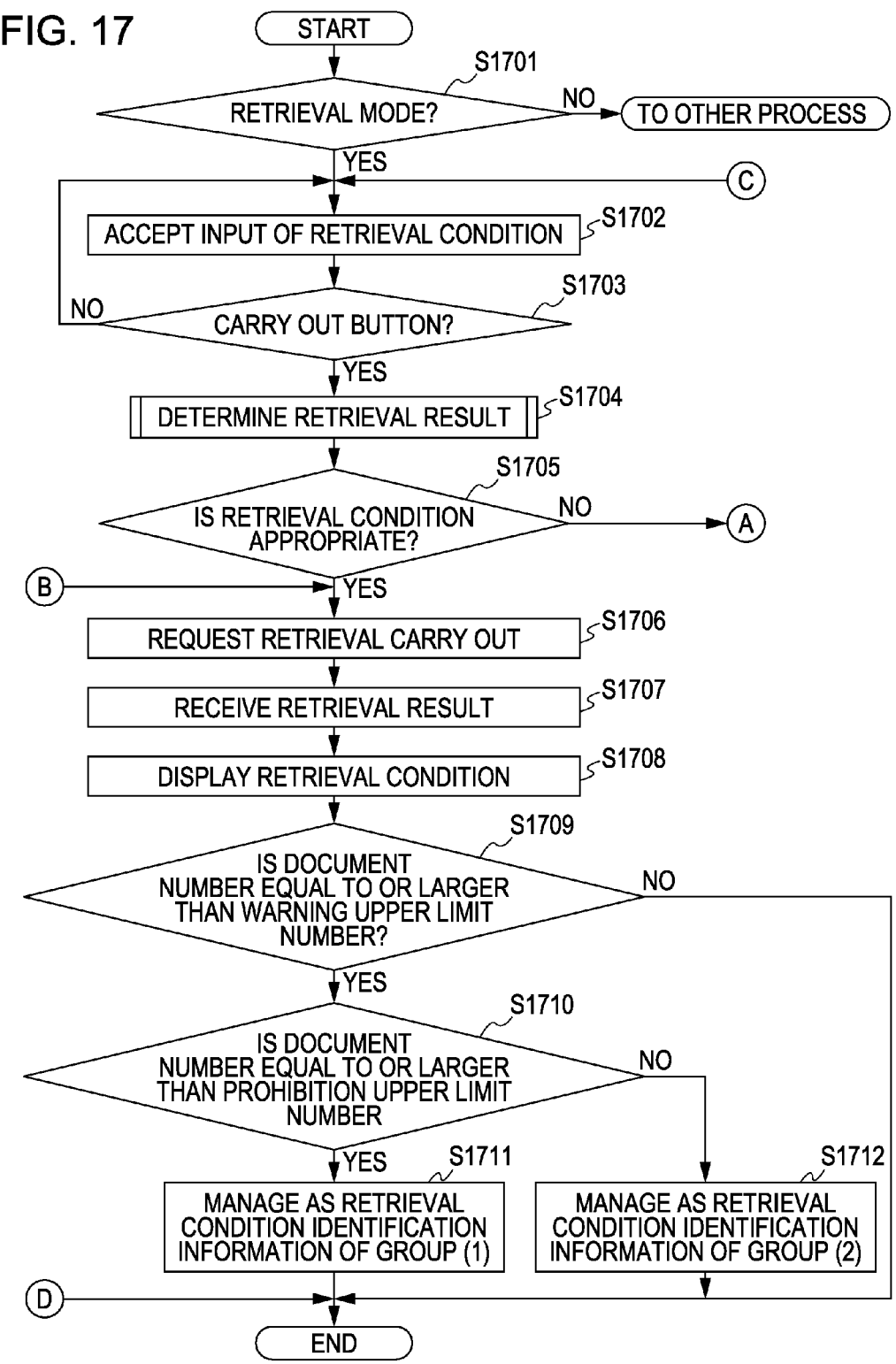
FIG. 17 is a flowchart describing a series of processes for carrying out the retrieval and managing the retrieval condition identification information based on the retrieval result according to an exemplary embodiment of the present invention.
Figure 18:
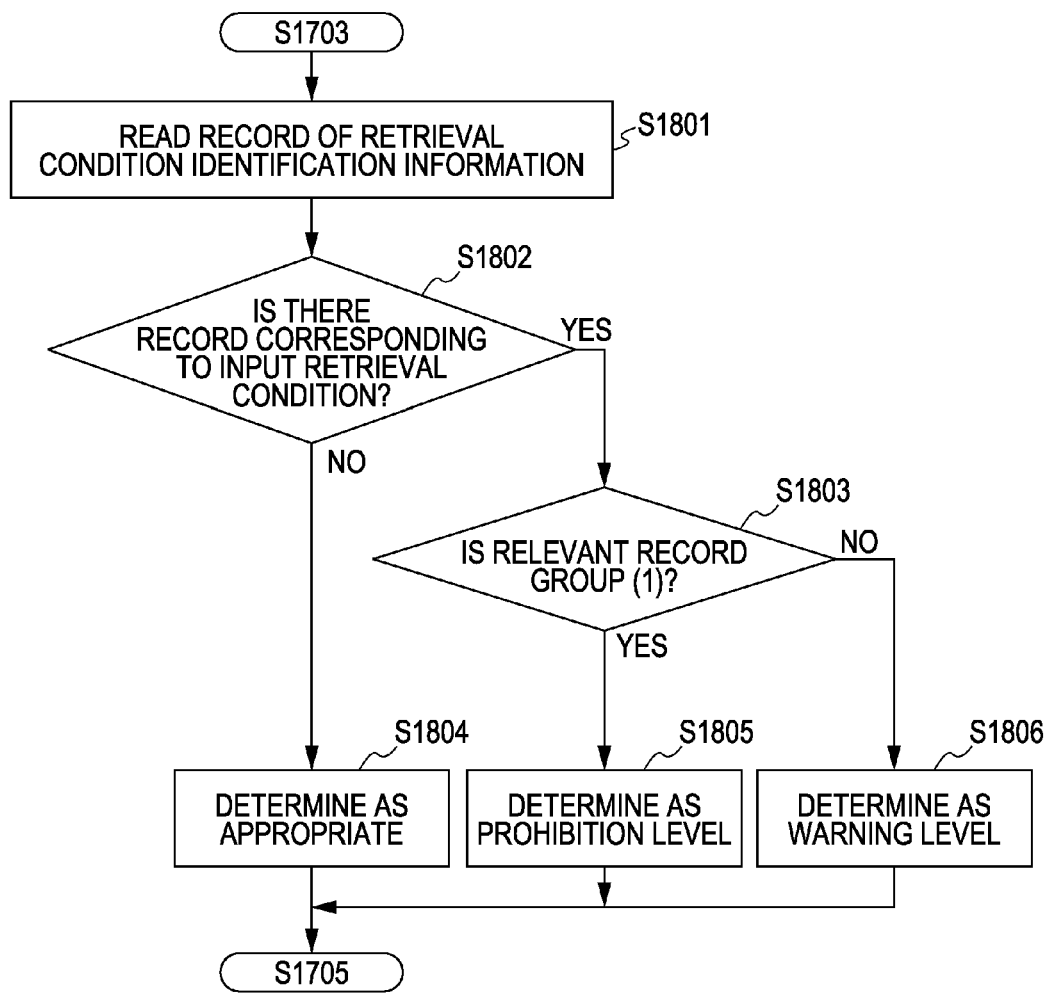
FIG. 18 is a flowchart describing a series of processes for determining whether the retrieval condition is appropriate according to an exemplary embodiment of the present invention.
Figure 19:
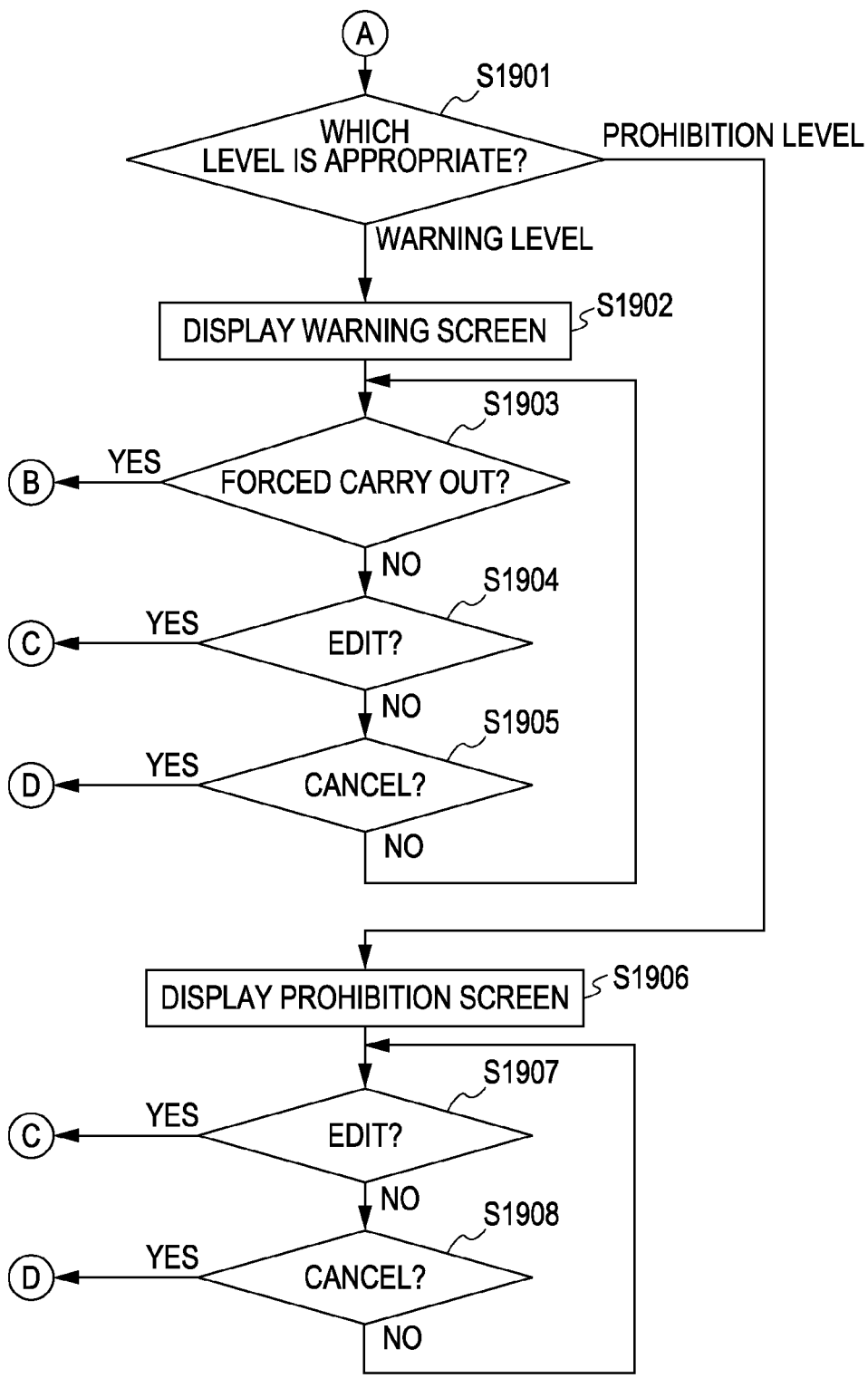
FIG. 19 is a flowchart describing a series of processes executed in a case where it is determined that the retrieval condition is not appropriate according to an exemplary embodiment of the present invention.

Next, with use of the flowcharts of FIGS. 17 to 19, a description will be provided of an operation related to a process for determining whether the retrieval condition input by a user is appropriate before the retrieval is carried out based on the information illustrated in FIG. 16.

FIG. 17 is a flowchart describing an operation for determining whether the input retrieval condition is appropriate, executing the retrieval when it is determined that the retrieval condition is appropriate, and managing the information for identifying the retrieval condition when the number of documents in the retrieval results is greater than or equal to the set number of documents. First, in step S1701, it is determined whether the retrieval mode is selected by the user. At this time, when the retrieval mode is selected, the process advances to step S1702, and the input of the retrieval condition by the user is accepted on the retrieval mode principle screen illustrated in FIG. 3. In step S1701, if another mode other than the retrieval mode is selected, the mode is shifted to a corresponding mode.

Next, in step S1702, it is determined whether the carry out button 340 is selected. When it is determined that the carry out button 340 is selected, the process advances to step S1704 to determine whether the input retrieval condition is appropriate. Subsequently, in step S1705, based on the result of the determination in step S1704, it is determined whether the retrieval condition is appropriate. When it is determined that the retrieval condition is appropriate, the process advances to step S1706.

In step S1706, the retrieval carry out request including the input retrieval condition is sent to the document management server 130. Next, in step S1707, the retrieval result including information indicating the number of documents included in the retrieval results and index information of those documents is received from the document management server 130. In step S1708, the retrieval result is displayed on the operation panel unit 230.

In step S1709, it is determined whether the document number notified from the document management server 130 as the retrieval result exceeds the warning upper limit number. When it is determined that the number of documents included in the retrieval results exceeds the warning upper limit number, then in step S1710 it is determined whether the number of documents included in the retrieval results exceeds the prohibition upper limit number. At this time, when it is determined that the number exceeds the prohibition upper limit number, the process advances to step S1711, where a record is newly created in the group (1) of the retrieval condition identification information as the information for identifying the retrieval condition used for the retrieval.

When it is determined in step S1710 that the number is below the prohibition upper limit number, the process advances to step S1712, where a record is newly created in the group (2) of the retrieval condition identification information as the information for identifying the retrieval condition used for the retrieval (or the record is updated) to end the process. It should be noted that in step S1709, when it is determined that the document number is below the warning upper limit number, the process ends.

FIG. 18 is a flowchart describing a process for determining the input retrieval condition in step S1704 of FIG. 17. First, in step S1801, the records of the retrieval condition identification information managed in the MEMORY 212 are read out. Next, it is determined in step S1802 whether the record that identifies the input retrieval condition in step S1702 exists in the records read out in step S1801. When the relevant record exists, the process advances to step S1803, where it is determined whether the record is classified into the group (1).

As a result of the determination in step S1803, when it is determined that the relevant record is classified into the group (1), it is determined in step S1805 that the input retrieval condition is at the prohibition level, and the process advances to step S1705. On the other hand, when it is determined that the relevant record is not classified into the group (1) (that is, the relevant record is classified into the group (2)), it is determined in step S1806 that the input retrieval condition is at the warning level, and the process advances to step S1705.

FIG. 19 is a flowchart describing an operation in a case where it is determined in step S1705 of FIG. 17 that the retrieval condition is not appropriate. First, in step S1705, when it is determined that the retrieval condition is not appropriate, flow proceeds to Step S1901, where the prohibition level or the warning level is determined.

When it is determined that the level is the warning level, the process advances to Step S1902 to display the screen illustrated in FIG. 9. Then, in steps S1903 to S1905, it is determined which one of the buttons 911 to 913 is selected by the user and the processes are varied in accordance with the determination. It should be noted that this operation is similar to that in steps S802 to S804 of FIG. 8, and thus a description thereof is omitted.

When it is determined in step S1901 that the level is the prohibition level, the process advances to step S1906 to display the screen illustrated in FIG. 9. It should be noted that, at this time, since the carry out of the retrieval with use of the input retrieval condition is prohibited in step S1702, the button 911 is not displayed and only the buttons 912 and 913 are displayed. Then, in steps S1907 and S1908, it is determined which one of the buttons 912 and 913 is selected by the user and the processes are varied in accordance with the determination. It should be noted that this operation is similar to that in steps S803 and S804 of FIG. 8, and thus a description thereof is omitted.

According to the present embodiment, two types of upper limit numbers are set and the determination is made whether the input retrieval condition is appropriate based on the respective numbers. Then, in accordance with the result of this determination, the control contents for controlling not to carry out the retrieval with use of the input retrieval condition are varied. With this configuration, in addition to the effects as described in the first embodiment, there is an effect that the detailed determination for the input retrieval condition and the appropriate control in accordance with the determination can be performed.

More specifically, for example, when a retrieval condition is input whose results can be checked by a user and expected to be larger than the limit, it is possible to prohibit the carrying out of the retrieval with use of the retrieval condition. Then, when a retrieval condition is input whose results will not be larger than the above-described limit number, but a relatively large number of documents are expected to be included in the retrieval results, it is possible to issue a warning to the user that the retrieval should not be carried out using the particular retrieval condition.

Next, a fifth exemplary embodiment of the present invention will be described. Only the difference(s) between the present embodiment and the first exemplary embodiment will be described herein. According to the first embodiment, the record managed as the retrieval condition identification information is automatically updated to reflect the updated information.

Figure 20:
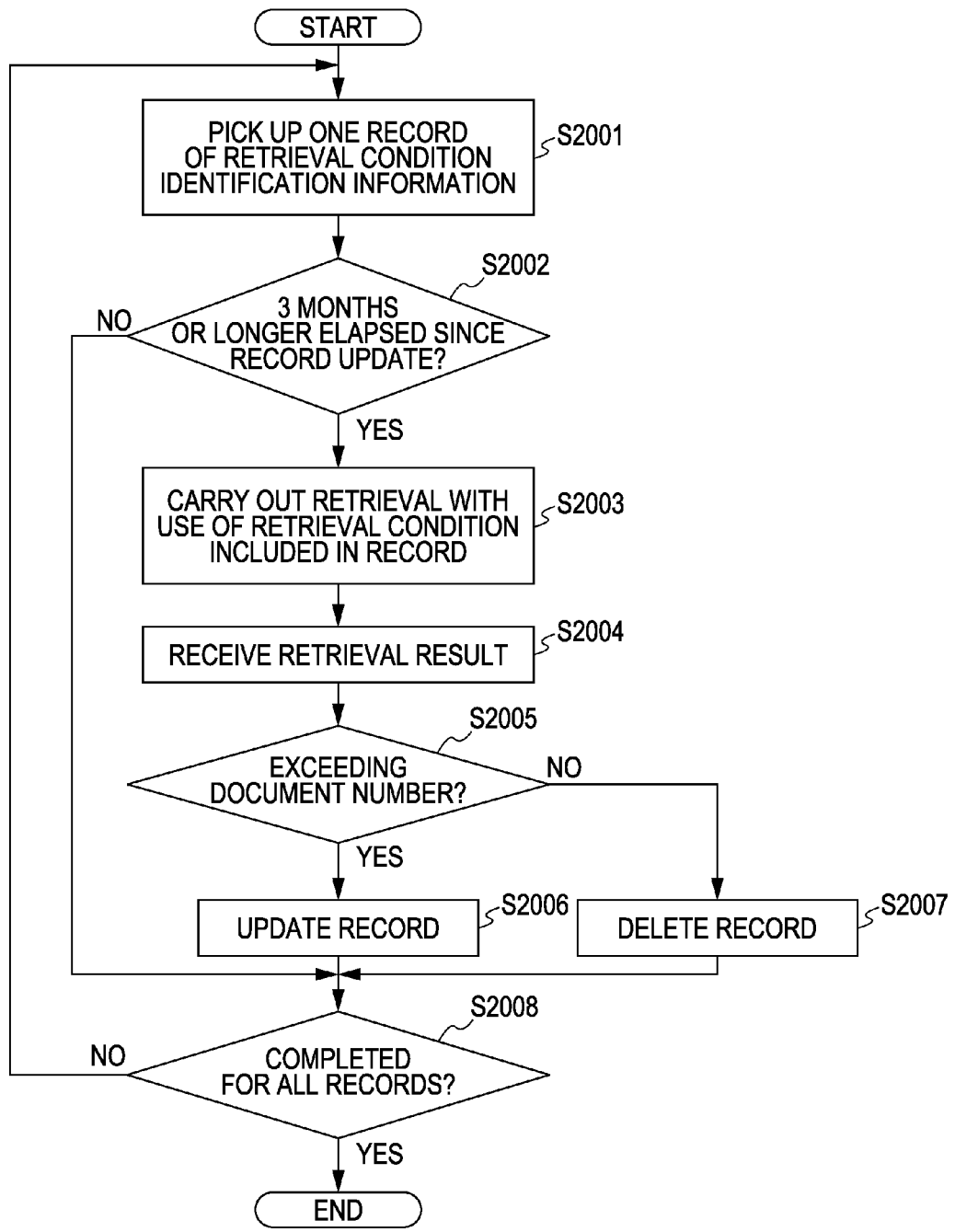
FIG. 20 is a flowchart describing a series of processes for updating the retrieval condition identification information according to an exemplary embodiment of the present invention.

FIG. 20 is a flowchart describing an operation, which is automatically executed at an arbitrary timing while the MFP 100 is not operated, for executing a process for updating or deleting the record managed as the retrieval condition identification information. It should be noted that this process may be executed in response to a manual instruction from a user.

First, in step S2001, one record is picked up from the retrieval condition identification information stored in the MEMORY 212. Then, in step S2002, the information stored in the area 504 of the picked up record is referred to, and it is determined whether three months or longer have elapsed since the date of the recent record update. It should be noted that while three months is used in the present embodiment, this value is not limited to three months, and can be set to any value by a user.

In step S2002, when it is determined that three months have not elapsed since the date of the recent record update, the process advances to step S2008. When it is determined that three months have elapsed since the recent update date, the process advances to step S2003, where the retrieval request including the retrieval condition that is stored in the area 501 of the picked up record is issued to the document management server 130.

In step S2004, information indicating the number of documents included in the results notified from the document management server 130, is received. Then, in step S2005, it is determined whether the received document number exceeds the previously set upper limit number. As a result, when it is determined that the document number exceeds the upper limit number, the process advances to step S2006 to update the information stored in the areas 503 to 505 in the record. On the other hand, when it is determined that the document number is below the upper limit number, the process advances to step S2007 to delete the record. In Step S2008, it is determined whether the process is performed for all the records managed as the retrieval condition identification information. When the process is completed for all the records, the process ends and when there are unprocessed records, the process returns to step S2001.

According to the present embodiment, the record managed as the retrieval condition identification information is updated or deleted based on the updated information. With this configuration, for example, even when the number of documents included in the retrieval results is larger than the upper limit number of documents using a certain retrieval condition, if the number of documents is reduced over time and the number of documents is below the upper limit number, the record can be deleted.

A description has also been given herein based on the first embodiment, but it is also possible to adopt the present invention to a case where the record is managed while being distinguished between the warning level and the prohibition level as in the fourth embodiment. More specifically, if the number of documents retrieved with the retrieval condition identified by the record that is managed as the group (2) (the warning level) is increased over time, the record can be shifted from the group (2) to the group (1) (the prohibition level) for update. That is, according to the present embodiment, the retrieval condition identification information is managed based on the updated information, and therefore it is possible to determine whether the input retrieval condition is appropriate based on more accurate information.

Next, a sixth exemplary embodiment of the present invention will be described. The difference(s) between the sixth exemplary embodiment and the first exemplary embodiment are as follows. According to the first embodiment, the record is managed as the retrieval condition identification information. According to the present embodiment, the record is automatically updated in response to the total number of documents stored in the document management server 130 to reflect the updated information. The fundamental configuration according to the present embodiment is similar to that of the first embodiment. Herein, with regard to the present embodiment, only the difference(s) between the present embodiment and the first embodiment will be described. It should be noted that according to the present embodiment, as has been described in the fourth embodiment, two types of upper limit numbers are used for managing the record of the retrieval condition identification information.

Figure 21:
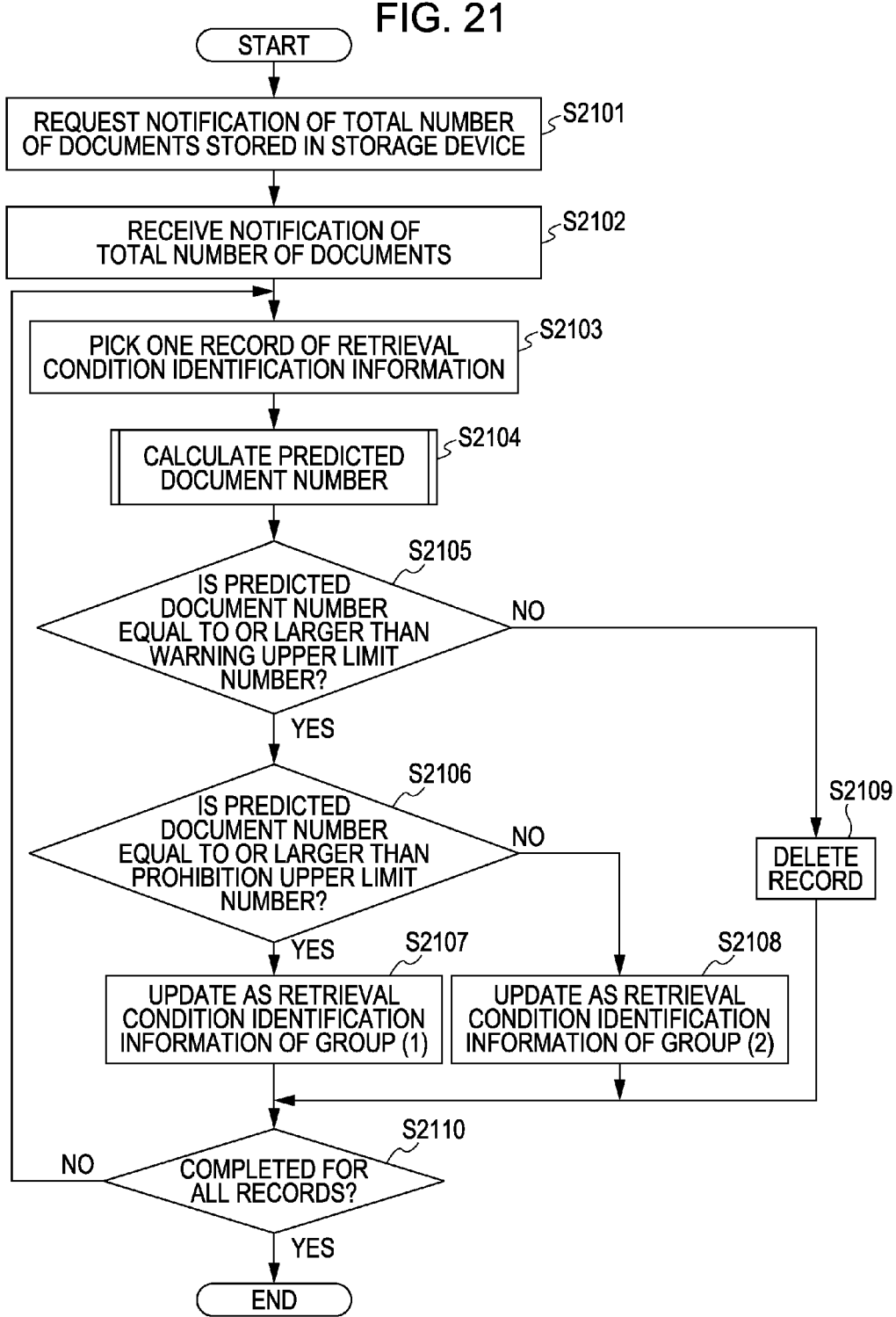
FIG. 21 is a flowchart describing a series of processes for updating the retrieval condition identification information according to an exemplary embodiment of the present invention.

FIG. 21 is a flowchart describing an operation, which is automatically executed at an arbitrary timing while the MFP 100 is not operated, for executing a process for updating or deleting the record managed as the retrieval condition identification information. It should be noted that this process may be executed in response to a manual instruction from the user.

First, in step S2101, a request is issued to the document management server 130 to notify the total number of documents stored in the storage device 133. Then, in step S2102, information indicating the total number of documents notified from the document management server 130 is received.

In step S2103, one record of the retrieval condition identification information stored in the MEMORY 212 is picked up. Next, in step S2104, a predicted number of documents is calculated based on the information received in step S2102 and the information stored in the areas 503 and 505 of the record picked up in step S2103. The predicted document number is the number of documents included in the retrieval results at the time when the respective retrieval conditions are used for the retrievals based on the total number of documents currently stored in the storage device. That is, the predicted document number is calculated in the following expression: "the predicted document number"="the document number in the record area 503"×("the total number of documents received in Step S2102"/"the total number of documents in the record area 505")].

Herein, as being proportional to the increase or decrease in the total number of stored documents, while it is assumed that the number of documents retrieved with the same retrieval condition may be increased or decreased, the number of documents to be retrieved based on the increase or decrease in the total number of documents is predicted.

In step S2105, it is determined whether the calculated predicted number of documents exceeds the warning upper limit number. When it is determined that the document number is below the warning upper limit number, the process advances to step S2109 to delete the record picked up in step S2103. When it is determined in step S2105 that the predicted number of documents exceeds the warning upper limit number, in Step S2106, a determination whether the predicted number of documents exceeds the prohibition upper limit number is performed.

When it is determined that the predicted number of documents exceeds the prohibition upper limit number, the process advances to step S2107 to update the record picked up in step S2103 as the record of the group (1). When it is determined in step S2106 that the predicted number of documents is below the prohibition upper limit number, the process advances to step S2108 to update the record picked up in step S2103 as the record of the group (2).

In step S2110, it is determined whether the process is completed for all the records managed as the retrieval condition identification information. When there are unprocessed records, the process returns to step S2103. When all the records are processed, the process is completed.

According to the present embodiment, the record managed as the retrieval condition identification information is updated or deleted based on the increase or decrease in the total number of documents stored in the storage device. With this configuration, in addition to the effects as described in the first embodiment, it becomes unnecessary to carry out the retrieval for updating the retrieval condition identification information all the way. Therefore, it is possible to simply keep the retrieval condition identification information to date, thus further improving the usability.

It should be noted that the contents described in the above exemplary embodiments may be embodied in a separated form or may be embodied in a combined manner. Also, the method of specifying the retrieval condition, the method of managing the retrieval condition identification information, or the content of the document set as the retrieval target is not limited to the above and may take another mode.

Exemplary embodiments of the present invention have been described in detail but, for example, the present invention may take various embodiments such as a system, a device, a method, a program, or a storage medium (recording medium). To be more specific, the present invention may be applied to a system composed of a plurality of devices or to an apparatus formed of one device.

It should be noted that the present invention includes a case where a software program for realizing the functions of the above-described exemplary embodiments (a program corresponding to the flowchart illustrated in the drawing according to the embodiments) is directly or remotely supplied to a system or an apparatus. Then, a computer of the system or the apparatus reads out and executes the thus supplied program code.

Therefore, the program code itself to be installed in the computer for realizing the function process of the present invention realizes the present invention. In other words, the present invention includes the program code itself for realizing the function process of the present invention.

In that case, a mode such as an object code, a program to be executed by an interpreter, or a script data to be supplied to the OS may be adopted as long as it has the function of the program.

A recording medium for supplying the program includes, for example, a floppy disc, a hard disk, an optical disc, an opto-magnetic disc, an MO, a CD-ROM, a CD-R, a CD-RW, a magnetic tape, a non-volatile memory cart, a ROM, and a DVD (DVD-ROM, DVD-R).

In addition, the program can also be supplied by using a browser of a client computer and downloading the program into a recording medium from a web site of the Internet, that is, a connection is made to a web site, and the computer program itself of the present invention or a compressed file including an automatic install function is downloaded from the web site. Also, the present invention can also be realized in such a manner that the program code constituting the program of the present invention is divided into a plurality of files and the respective files are downloaded from different web sites. In other words, a WWW server for allowing a plurality of user to download the program file for realizing the function process of the present invention in the computer is also within the scope of the present invention.

Also, the program of the present invention is encoded and stored in the storage medium such as a CD-ROM to be distributed to the user. Then, the user who clears a predetermined condition is allowed to download key information for decoding from a web site via the Internet. Then, the present invention can be realized in such a manner that with use of the key information, the encoded program is executed to be installed to the computer.

In addition, the functions of the above-described embodiments are realized by the computer which executes the read program. In addition to the above, on the basis of the program instruction, the OS operating on the computer executes a part or an entirety of the actual process, and the functions of the above-described embodiments may be realized through the process.

Furthermore, after the program read out from the recording medium is written to a function expansion board inserted to the computer or a function expansion unit provided to the computer, the functions of the above-described embodiments are realized. That is, the functions of the above-described embodiments are also realized when a CPU or the like provided to the function expansion board or the function expansion unit executes a part or an entirety of the actual process on the basis of the program instruction.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-173622 filed Jun. 23, 2006, which is hereby incorporated by reference herein in its entirety.

What is claimed is:

1. A document retrieval system, which performs a retrieval of at least one document from documents stored in a plurality of storage devices in accordance with a retrieval condition input by a user, comprising:
   (A) a selection unit configured to select at least one storage device, in which the retrieval is carried out, from the plurality of storage devices;
   (B) an input unit configured to input the retrieval condition;
   (C) a management unit configured to manage information indicating a number of documents which satisfy the retrieval condition based on a result of the retrieval, the information being managed for each storage device;
   (D) a determination unit configured to determine, based on the information managed by the management unit, whether a number of documents which are expected to be obtained as a result of the retrieval carried out in the at least one selected storage device is larger than a predetermined number, the determination being performed in response to an instruction from a user to carry out the retrieval and being performed before the retrieval is carried out;
   (E) a display unit configured to display, in a case where it is determined that the number of documents which are expected to be obtained as a result of the retrieval carried out in the at least one selected storage device is larger than the predetermined number,
   (F) Display of a warning message for notifying a user that the retrieval should not be carried out;
   (G) a setting unit configured to set a first number and a second number, which is smaller than the first number, wherein a control unit prohibits carrying out the retrieval in a case where it is determined that the number of documents which are expected to be obtained as a result of the retrieval carried out in the at least one selected storage device is larger than the first number, and notify a user that the retrieval should not be carried out in a case where it is determined that the number of documents which are expected to be obtained as a result of the retrieval carried out in the at least one selected storage device is larger than the second number and smaller than the first number; and
   (H) an updating unit configured to update the managed information which has not been used for longer than a predetermined period.

2. The document retrieval system according to claim 1, further comprising a requesting unit configured to request each selected storage device to carry out the retrieval in accordance with the retrieval condition input by the input unit.

3. The document retrieval system according to claim 1, wherein a storage device selected from the plurality of storage devices is a document management server.

4. The document retrieval system according to claim 1, wherein the retrieval condition includes at least keywords included in the at least one document or at least one logical expression that represents a combination of the keywords.

5. The document retrieval system according to claim 1, wherein the management unit manages the information in a case where a number of documents obtained as the result of the retrieval is larger than the predetermined number.

6. The document retrieval system according to claim 1, wherein the display unit displays a screen for editing the input retrieval condition in a case where it is determined that the number of documents which are expected to be obtained as a result of the retrieval carried out in the at least one selected storage device is larger than the predetermined number.

7. A document retrieval apparatus, which requests a plurality of document management servers connected to the document retrieval apparatus to carry out a retrieval in accordance with a retrieval condition input by a user, comprising:

(A) a selection unit configured to select at least one storage device, in which the retrieval is carried out, from the plurality of storage devices;

(B) an input unit configured to input the retrieval condition;

(C) a management unit configured to manage information indicating a number of documents which satisfy the retrieval condition based on a result of the retrieval, the information being managed for each storage device;

(D) a determination unit configured to determine, based on the information managed by the management unit, whether a number of documents which are expected to be obtained as a result of the retrieval carried out in the at least one selected storage device is larger than a predetermined number, the determination being performed in response to an instruction from a user to carry out the retrieval and being performed before the retrieval is carried out;

(E) a display unit configured to display, in a case where it is determined that the number of documents which are expected to be obtained as a result of the retrieval carried out in the at least one selected storage device is larger than the predetermined number, (F) Display of a warning message for notifying a user that the retrieval should not be carried out;

(G) a setting unit configured to set a first number and a second number, which is smaller than the first number, wherein a control unit prohibits carrying out the retrieval in a case where it is determined that the number of documents which are expected to be obtained as a result of the retrieval carried out in the at least one selected storage device is larger than the first number, and notify a user that the retrieval should not be carried out in a case where it is determined that the number of documents which are expected to be obtained as a result of the retrieval carried out in the at least one selected storage device is larger than the second number and smaller than the first number; and (H) an updating unit configured to update the managed information which has not been used for longer than a predetermined period.

8. A method for retrieving a document from documents stored in a plurality of storage devices according to a retrieval condition input by a user, the method comprising:

(A) selecting at least one storage device, in which the retrieval is carried out, from the plurality of storage devices;

(B) inputting the retrieval condition;

(C) manage information indicating a number of documents which satisfy the retrieval condition based on a result of the retrieval, the information being managed for each storage device;

(D) determine, based on the information managed by the management unit, whether a number of documents which are expected to be obtained as a result of the retrieval carried out in the at least one selected storage device is larger than a predetermined number, the determination being performed in response to an instruction from a user to carry out the retrieval and being performed before the retrieval is carried out;

(E) display, in a case where it is determined that the number of documents which are expected to be obtained as a result of the retrieval carried out in the at least one selected storage device is larger than the predetermined number, (F) Display of a warning message for notifying a user that the retrieval should not be carried out;

(G) set a first number and a second number, which is smaller than the first number, wherein a control unit prohibits carrying out the retrieval in a case where it is determined that the number of documents which are expected to be obtained as a result of the retrieval carried out in the at least one selected storage device is larger than the first number, and notify a user that the retrieval should not be carried out in a case where it is determined that the number of documents which are expected to be obtained as a result of the retrieval carried out in the at least one selected storage device is larger than the second number and smaller than the first number; and (H) update the managed information which has not been used for longer than a predetermined period.

9. A computer-readable storage medium storing computer-executable process steps, for the computer-executable process steps causing a computer to perform the method of claim 8.

* * * * *